(12) United States Patent
Kabasawa

(10) Patent No.: US 11,009,029 B2
(45) Date of Patent: May 18, 2021

(54) VACUUM PUMP, AND ROTOR BLADE AND REFLECTION MECHANISM MOUNTED IN VACUUM PUMP

(71) Applicant: Edwards Japan Limited, Chiba (JP)

(72) Inventor: Takashi Kabasawa, Chiba (JP)

(73) Assignee: Edwards Japan Limited, Chiba (JP)

( * ) Notice: Subject to any disclaimer, the term of this patent is extended or adjusted under 35 U.S.C. 154(b) by 307 days.

(21) Appl. No.: 15/781,942

(22) PCT Filed: Dec. 8, 2016

(86) PCT No.: PCT/JP2016/086592
§ 371 (c)(1),
(2) Date: Jun. 6, 2018

(87) PCT Pub. No.: WO2017/104541
PCT Pub. Date: Jun. 22, 2017

(65) Prior Publication Data
US 2018/0363662 A1 Dec. 20, 2018

(30) Foreign Application Priority Data

Dec. 15, 2015 (JP) .............................. JP2015-244554
Jun. 30, 2016 (JP) .............................. JP2016-130497

(51) Int. Cl.
*F04D 19/04* (2006.01)
*F04D 29/04* (2006.01)
(Continued)

(52) U.S. Cl.
CPC ......... *F04D 19/042* (2013.01); *F04D 17/168* (2013.01); *F04D 29/083* (2013.01);
(Continued)

(58) Field of Classification Search
None
See application file for complete search history.

(56) References Cited

U.S. PATENT DOCUMENTS

| 5,350,275 A | 9/1994 | Ishimaru |
| 5,553,998 A * | 9/1996 | Muhlhoff ............. F04D 19/046 |
| | | 415/143 |

(Continued)

FOREIGN PATENT DOCUMENTS

| JP | S5973595 U | 5/1984 |
| JP | S6125995 A | 2/1986 |

(Continued)

OTHER PUBLICATIONS

Communication dated Jul. 9, 2019 and European Search Report dated Jul. 2, 2019 for corresponding European application Serial No. EP16875521.3.

(Continued)

*Primary Examiner* — Ninh H. Nguyen
*Assistant Examiner* — Jason Fountain
(74) *Attorney, Agent, or Firm* — Theodore M. Magee; Westman, Chamlin & Koehler, P.A.

(57) ABSTRACT

A reflection mechanism is disposed above a rotor blade. A chamfered surface of the rotor blade is formed to gradually open wide by 0 to 10 degrees toward the downstream side in the rotational direction, from an imaginary line passing through a rotational direction-side tip end point of a horizontal surface and drawn parallel to a rotating shaft. In the reflection mechanism, inclined plates, inclined at a predetermined angle, are arranged radially in the radial direction from a central disc portion. A particle reflected on the chamfered surface of the rotor blade collides with each inclined plate of the reflection mechanism and is then re-reflected and falls in the downstream direction. Since the particle can securely be reflected toward the reflection mechanism, the particle can be prevented from exiting through an inlet port to flow back toward a chamber.

18 Claims, 22 Drawing Sheets

(51) Int. Cl.
  *F04D 29/54* (2006.01)
  *F04D 17/16* (2006.01)
  *F04D 29/08* (2006.01)
  *F04D 29/058* (2006.01)
  *F16C 32/04* (2006.01)
  *F04D 29/32* (2006.01)

(52) U.S. Cl.
  CPC ......... *F04D 29/324* (2013.01); *F04D 29/544* (2013.01); *F04D 19/048* (2013.01); *F04D 29/058* (2013.01); *F05D 2240/303* (2013.01); *F05D 2250/70* (2013.01); *F16C 32/0446* (2013.01); *F16C 2360/45* (2013.01)

(56) References Cited

U.S. PATENT DOCUMENTS

| | | | | |
|---|---|---|---|---|
| 6,290,457 | B1* | 9/2001 | Kabasawa | F04D 19/042 |
| | | | | 415/90 |
| 9,512,848 | B2* | 12/2016 | Bottomfield | F04D 19/042 |
| 2012/0087786 | A1* | 4/2012 | Hsu | F04D 19/042 |
| | | | | 415/199.4 |
| 2014/0186169 | A1* | 7/2014 | Bottomfield | F04D 19/042 |
| | | | | 415/183 |

FOREIGN PATENT DOCUMENTS

| | | |
|---|---|---|
| JP | H0814188 A | 1/1996 |
| JP | 2004019493 A | 1/2004 |
| JP | 2006307823 A | 11/2006 |
| JP | 2007046461 A | 2/2007 |
| JP | 2008144630 A | 6/2008 |
| JP | WO2008065798 A | 3/2010 |
| JP | 2011185094 A | 9/2011 |
| WO | WO-2008065798 A1 * 6/2008 ........... F04D 29/524 |

OTHER PUBLICATIONS

PCT International Search Report dated Mar. 7, 2017 for corresponding PCT Application No. PCT/JP2016/086592.
PCT International Written Opinion dated Mar. 7, 2017 for corresponding PCT Application No. PCT/JP2016/086592.

* cited by examiner

VACUUM PUMP, AND ROTOR BLADE AND REFLECTION MECHANISM MOUNTED IN VACUUM PUMP

CROSS-REFERENCE OF RELATED APPLICATION

This application is a Section 371 National Stage Application of International Application No. PCT/JP2016/086592, filed Dec. 8, 2016, which is incorporated by reference in its entirety and published as WO 2017/104541 A1 on Jun. 22, 2017 and which claims priority of Japanese Application No. 2015-244554, filed Dec. 15, 2015 and Japanese Application No. 2016-130497, filed Jun. 30, 2016.

BACKGROUND

The present invention relates to a vacuum pump, and a rotor blade and a reflection mechanism that are mounted in the vacuum pump, and more particularly to a vacuum pump that prevents a particle from flowing back toward the gas inflow side, and a rotor blade and a reflection mechanism that are mounted in the vacuum pump.

With the recent development of electronics, the demand for semiconductors such as memories and integrated circuits has been increasing rapidly.

These semiconductors are manufactured by doping, with impurities, a semiconductor substrate of extremely high purity to provide electrical properties, or by forming a fine circuit on a semiconductor substrate by means of etching.

These operations need to be performed in a high vacuum chamber in order to avoid the influence of dust and the like in the air. Typically a vacuum pump is used to evacuate this chamber. In particular, a turbomolecular pump, one of vacuum pumps, is frequently used because of less residual gas generated therein, easy maintenance, and the like.

In terms of the manufacturing process of semiconductors, there exist a large number of processes for causing a variety of process gasses to act on a semiconductor substrate, and the turbomolecular pump is used not only to evacuate the inside of the chamber but also to exhaust these process gasses from the inside of the chamber.

This turbomolecular pump has a casing that configures a casing having an inlet port and an outlet port. A structure for exhibiting an exhaust function of the turbomolecular pump is housed in this casing. The structure for exhibiting the exhaust function of the turbomolecular pump is configured roughly by a rotating portion supported rotatably and a stator portion fixed to the casing.

The rotating portion is configured by a rotating shaft and a rotating body fixed to this rotating shaft, wherein the rotating body has a plurality of rotor blades protruding radially in a radial direction. The stator portion has a plurality of stator blades that are disposed so as to alternate with the rotor blades.

In addition, a motor for rotating the rotating shaft at high speed is provided. When the rotating shaft is rotated at high speed by the function of the motor, gas is drawn from the inlet port and exhausted from the outlet port by the actions of the rotor blades and the stator blades.

Incidentally, in the turbomolecular pump, a particle (e.g., a particle of several μm to several hundreds of μm) made of a reaction product generated in the chamber is introduced from the inlet port through a pipe or a valve in the middle.

After having collided with the rotor blades rotating at high speed on the inside of the turbomolecular pump, in some cases the particle is bounced back toward the chamber, that is, the particle may flow back from the inlet port toward the chamber. The particle that flows back from the turbomolecular pump in this manner might contaminate the inside of the chamber.

In particular, as shown in FIG. 18, a tip end portion of a rotor blade 10 in a direction of rotation thereof is usually chamfered at a predetermined angle in order to prevent burrs from occurring at the tip end portion or to prevent cutting hands at the time of assembly. Note that FIG. 18 also shows an enlarged view of this tip end portion. As is clear from the enlarged view, in most cases this chamfer angle is obtained in such a manner that an angle $\alpha$ between a horizontal surface 1 facing the inlet port and a chamfered surface 7 is equal to an angle $\beta$ between the chamfered surface 7 and a lower-side inclined surface 5.

As a result, the formed chamfered surface 7 is opened wide toward the downstream side by approximately 22.5 degrees from an imaginary line 11 passing through a rotational direction-side tip end point 9 of the horizontal surface 1 and drawn parallel to the rotating shaft.

Specifically, the chamfered surface 7 obliquely faces the inlet port.

Since the chamfered surface 7 is opened at such a wide angle as described above, when a particle collides with the chamfered surface 7 rotating at high speed, the particle is most likely bounced back toward the chamber.

Therefore, Japanese Patent Application Laid-open No. 2006-307823, Japanese Patent No. 5463037, Japanese Patent No. 5250201, and Japanese Patent No. 3444971 each propose a conventional technique for preventing the particle from flowing back toward the chamber.

Japanese Patent Application Laid-open No. 2006-307823 discloses a structure shown in FIG. 19 in which a tip end surface 13, parallel to the rotating shaft or slightly facing the downstream side, is formed on an inlet port-side edge portion of a rotor blade 12 and an angle portion R between the tip end surface 13 and a horizontal surface 15 has a small curvature.

Japanese Patent No. 5463037 discloses a structure shown in FIG. 20 in which a chamfered surface 19 of an inlet port-side edge portion of a rotor blade 17 is parallel to the rotating shaft or configured to slightly face the downstream side.

Moreover, Japanese Patent No. 5250201 discloses an example in which a backflow prevention structure for preventing a particle from flowing backwards is configured to be detachable from the inlet port.

In addition, Japanese Patent No. 3444971 discloses an example in which stator blades are provided upstream of rotor blades in order to prevent a particle from flowing backwards.

However, according to the technique described in Japanese Patent Application Laid-open No. 2006-307823, most of particles enter the curvature section of the angle portion R between the tip end surface 13 and the horizontal surface 15, as shown in FIG. 21. Since this section faces the inlet port, there is a risk that most of the particles are reflected toward the inlet port, as shown in FIG. 21. Because the direction in which the particle is reflected changes depending on the colliding position thereof, it is difficult to prevent the reflected particle from flowing backward.

According to the configuration described in Japanese Patent No. 5463037, most of the particles enter the chamfered surface 19 of a rotor blade 17A, and are then reflected in the horizontal direction or slightly toward the downstream side, as shown in FIG. 22. Because the speed at which the particle moves toward the downstream side is low, the particle re-collides with a rear surface of a rotor blade 17B after being reflected, the rotor blade 17B being located in front of the rotor blade 17A in the rotational direction. As a result, there is a risk that the particle is re-reflected toward the inlet port.

Moreover, if the configurations described in Japanese Patent No. 5250201 and Japanese Patent No. 3444971 are not designed to reduce the angle at which the particle is reflected, there is a risk that the particle passes through a gap between reflective plates without being bounced back by the reflective plates. Thus, without narrowing the arrangement interval between the reflective plates, these conventional techniques cannot exhibit a sufficient effect of preventing the backflow of the particle. However, narrowing the arrangement interval between the reflective plates brings about a negative effect that suction of gas is hindered by the reflective plates, resulting in deterioration of the exhaust performance.

The present invention was contrived in view of these problems of the prior art, and an object of the present invention is to provide a vacuum pump that prevents a particle from flowing back toward the gas inflow side, and a rotor blade and a reflection mechanism that are mounted in the vacuum pump.

The discussion above is merely provided for general background information and is not intended to be used as an aid in determining the scope of the claimed subject matter. The claimed subject matter is not limited to implementations that solve any or all disadvantages noted in the background.

SUMMARY OF THE INVENTION

The present invention (claim 1) is an invention of a vacuum pump, comprising: a rotating shaft; a rotor blade that is fixed to the rotating shaft and has a blade having a chamfered surface formed at a tip end portion thereof in a rotational direction; and a reflection mechanism that is disposed upstream of the rotor blade, wherein the chamfered surface is inclined in an oblique upstream direction at a predetermined angle from an axial direction of a rotating body in such a manner that a particle having collided with the chamfered surface is reflected toward the reflection mechanism.

Accordingly, the particle that is reflected on the chamfered surface of the rotor blade can be prevented from re-colliding with the rear surface of the front blade as it did in the prior art. As a result, the particle can securely be reflected toward the reflection mechanism. The direction of reflection of the particle can be kept within a narrow range located somewhat above the horizontal direction, keeping the size of the reflection mechanism minimum and minimizing the impact on the exhaust performance.

The present invention (claim 2) is an invention of the vacuum pump, wherein in the blade, the chamfered surface is formed in a collidable region L where the particle can collide, the collidable region L being specified based on Formula 1 below where d represents an interval between the blade and a blade adjacent thereto, v1 represents a fall velocity of the particle, and v2 represents a peripheral speed of the blade.

$$L = d \times v1/v2 \qquad \text{[Formula 1]}$$

Accordingly, the height of the chamfered surface of the rotor blade can be minimized, keeping the impact of the chamfered surface on exhaust performance minimum.

Furthermore, the present invention (claim 3) is an invention of the vacuum pump, wherein the reflection mechanism has an inclined plate for re-reflecting, toward a downstream side, the particle reflected on the chamfered surface, and the inclined plate is disposed radially in a radial direction.

Such a configuration can prevent the particle from being reflected toward an upstream side.

The present invention (claim 4) is an invention of the vacuum pump, wherein the reflection mechanism has an inclined plate for re-reflecting, toward a downstream side, the particle reflected on the chamfered surface, and the inclined surface is formed to protrude by a predetermined length from an inner wall of an inlet port in a radial direction.

Such a configuration can prevent the particle from being reflected toward the upstream side. Moreover, the inclined plate of the reflection mechanism is not installed in the center of the inlet port but only in the vicinity of a tip end of the rotor blade, reducing exhaust resistance and deterioration of the exhaust performance.

The present invention (claim 5) is an invention of the vacuum pump, wherein the inclined plate is inclined at a predetermined angle in the rotational direction, from an imaginary line extending from the inner wall of the inlet port toward a center of the inlet port.

Accordingly, the angle at which the particle enters the inclined plate can be set at approximately 90 degrees, whereby the particle can fall downward without being reflected radially outward. Consequently, reflection of the particle toward the upstream side can further be prevented more securely.

The present invention (claim 6) is an invention of the vacuum pump, wherein the inclined plate has a cutout formed at a lower portion thereof.

Accordingly, after being reflected on the chamfered surface, the particle is re-reflected on the inclined plate and then falls downward substantially securely without being re-reflected on the rear surface of the previous inclined surface.

The present invention (claim 7) is an invention of the vacuum pump, wherein the reflection mechanism is formed based on Formula 2 below where W presents an interval between the inclined plate and an inclined plate adjacent thereto, $\Phi$ represents an inclination angle of the inclined plate, H represents a height of the inclined plate, and $\theta$ represents a reflection angle of the particle.

$$W = H \times (1/\tan \theta + 1/\tan \Phi) \qquad \text{[Formula 2]}$$

Accordingly, the interval between the inclined plates of the reflection mechanism can be disposed optimally in such a manner that the particle reflected on the chamfered surface of the rotor blade does not pass through between the inclined plates. As a result, the impact of disposing the inclined plates of the reflection mechanism on the exhaust performance can be minimized.

The present invention (claim 8) is an invention of the vacuum pump, wherein a height of the inclined plate gradually becomes small as a radius from a center of the rotating shaft becomes small.

The height of the inclined plate of the reflection mechanism can gradually become small as the radius from the center of the rotating shaft becomes small as described above, thereby minimizing the impact of installing the inclined plate on the exhaust performance.

Moreover, the present invention (claim 9) is an invention of the vacuum pump, wherein the inclined plate is disposed in the vicinity of the blade and functions as a stator blade.

By being disposed in the vicinity of the blade of the rotor blade, the inclined plate of the reflection mechanism can function as a stator blade. In other words, the same exhaust action as the one caused between the rotor blade and the stator blade can be generated between the blade of the rotor blade and the inclined plate of the reflection mechanism. Therefore, deterioration of the exhaust performance that is caused by disposing the inclined place of the reflection mechanism can be reduced.

In addition, the present invention (claim 10) is an invention of the vacuum pump, wherein the reflection mechanism has an inclined surface or an inclined plate for re-reflecting, toward a downstream side, the particle reflected on the chamfered surface of the rotor blade, and the inclined surface or the inclined plate is formed in a circumferential direction.

Furthermore, the present invention (claim 11) is an invention of the vacuum pump, wherein the inclined surface or the inclined plate is configured in such a manner that the particle collides within a range of a height Ht of the inclined surface or the inclined plate, the height Ht being specified based on Formula 3 below where θ represents a reflection angle of the particle, Ri represents a horizontal distance from a center of the rotating shaft to a root of the blade, and Rc represents a horizontal distance from the center of the rotating shaft to the inclined surface or the inclined plate.

$$Ht > (Rc^2 - Ri^2)^{1/2} \times \tan\theta \quad \text{[Formula 3]}$$

According to these settings, the range of collision of the particle that is reflected on the chamfered surface of the rotor blade is contained in the range of the height of the inclined surface or the inclined plate.

Also, the present invention (claim 12) is an invention of the vacuum pump, further comprising a first fastening means for fastening the rotor blade to the rotating shaft, and a cover plate for covering the first fastening means.

Due to the presence of the cover plate, the particle is shielded by the cover plate and therefore is prevented from hitting the first fastening means. Consequently, the particle can be prevented from being reflected on the first fastening means to flow back toward the chamber.

The present invention (claim 13) is an invention of the vacuum pump, further comprising a second fastening means for fastening the cover plate to the rotating shaft or the rotor blade, wherein a surface of the second fastening means is formed into a smooth surface with no roughness.

Since the surface of the second fastening means is formed into a smooth surface with no roughness, the particle is not likely to be reflected on the second fastening means to flow back toward the chamber.

Moreover, the present invention (claim 14) is an invention of the vacuum pump, wherein an angle formed between the inclined surface or the inclined plate and the axial direction of the rotating body is 45 degrees or more.

As long as the angle formed by the inclined surface or the inclined plate of the reflection mechanism and the axial direction of the rotating body is 45 degrees or more, the particle having collided with this inclined surface or inclined plate is reflected in the downstream direction.

The present invention (claim 15) is an invention of the vacuum pump, wherein a surface of at least one of the blade and the reflection mechanism is subjected to a smoothing treatment.

Examples of the smoothing treatment include chemical polishing, electrolytic polishing, and plating. By smoothing the surface of each member by means of such a smoothing treatment, the particle can be reflected in a target direction more accurately, consequently increasing the accuracy to prevent backflow of the particle.

The present invention (claim 16) is an invention of the vacuum pump, wherein a surface of at least one of the blade and the reflection mechanism is subjected to a surface treatment so as to have roughness capable of capturing the particle.

The particle can be captured by the rotor blade or the reflection mechanism, preventing the particle from flowing backwards.

In addition, the present invention (claim 17) is an invention of the vacuum pump, wherein the reflection mechanism is installed so as to be detachable from an inlet port.

By making the reflection mechanism detachable, the reflection mechanism can be replaced easily, even when the particle adheres to the surface of the reflection mechanism and consequently deteriorates the effect of preventing backflow of the particle.

The present invention (claim 18) is an invention of a rotor blade that is mounted in the vacuum pump described in any one of claims 1 to 17.

Furthermore, the present invention (claim 19) is an invention of a reflection mechanism that is mounted in the vacuum pump described in any one of claims 1 to 17.

According to the present invention described above, the chamfered surface of the rotor blade is inclined in the oblique upstream direction at a predetermined angle from the axial direction of the rotating body in such a manner that the particle that is reflected on the chamfered surface of the rotor blade collides with the reflection mechanism. The particle that is reflected on the chamfered surface of the rotor body can be prevented from re-colliding with the rear surface of the previous blade as it did in the prior art. As a result, the particle can securely be reflected toward the reflection mechanism.

The Summary is provided to introduce a selection of concepts in a simplified form that are further described in the Detail Description. This summary is not intended to identify key features or essential features of the claimed subject matter, nor is it intended to be used as an aid in determining the scope of the claimed subject matter.

DESCRIPTION OF THE PREFERRED EMBODIMENTS

Figure 1:
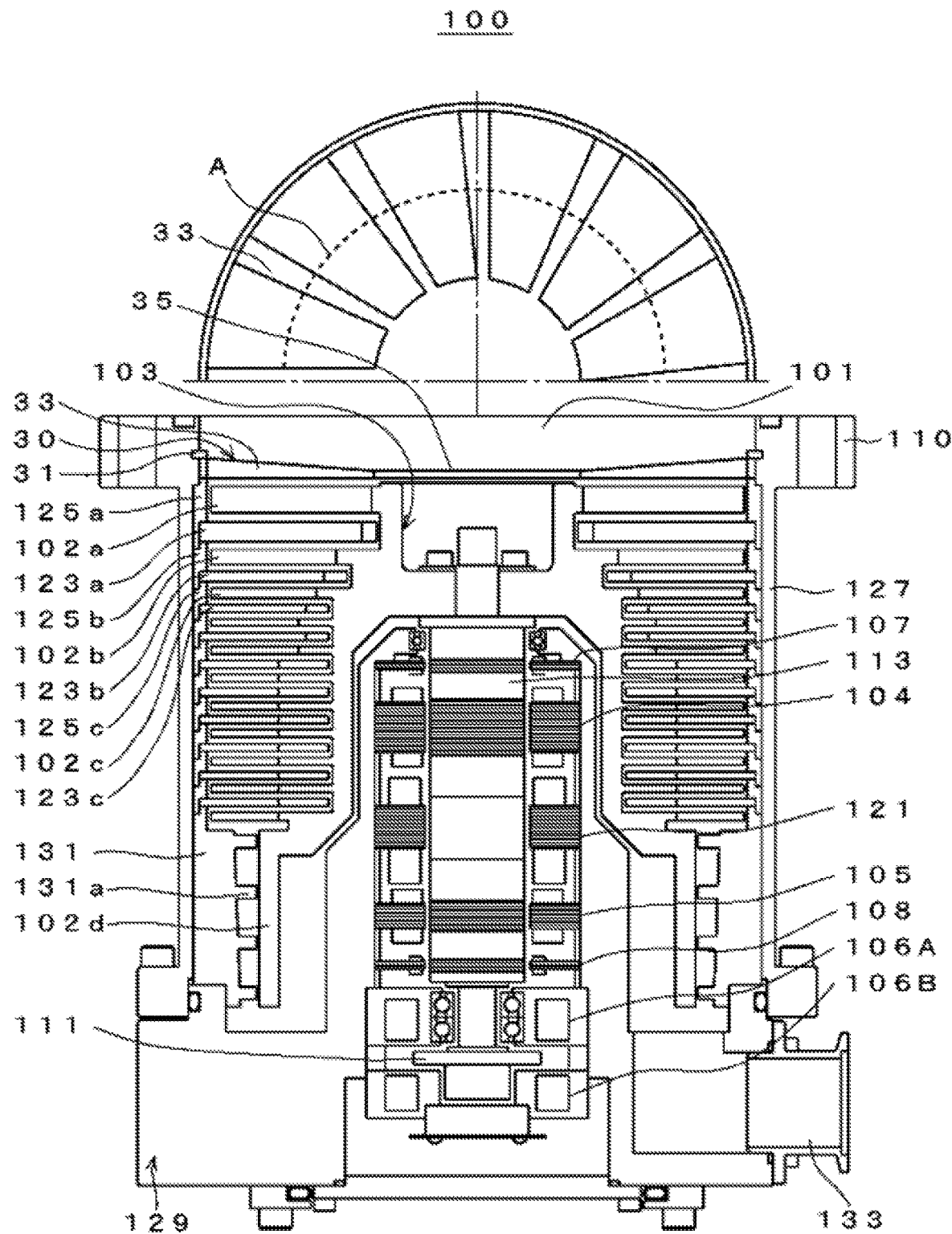
FIG. 1 is a configuration diagram of a turbomolecular pump according to a first embodiment of the present invention.

A first embodiment of the present invention is now described below. A configuration diagram of the first embodiment of the present invention is shown in FIG. 1. The lower part of FIG. 1 is a longitudinal sectional view of a turbomolecular pump and the upper part shows the inside of an inlet port from above. In FIG. 1, an inlet port 101 is formed on the inside of a flange 110 provided at an upper end of a cylindrical outer cylinder 127 of a turbomolecular pump 100. The outer cylinder 127 is made of a metal such as aluminum, iron, stainless steel, copper, or an alloy including these metals as the components.

The inside of the outer cylinder 127 is provided with a rotating body 103 in which a plurality of rotor blades 102a, 102b, 102c etc., configured by turbine blades for sucking and exhausting gas, are formed radially in multiple stages in a circumferential portion of the outer cylinder 127. The rotating body 103 is made of a metal such as aluminum, iron, stainless steel, copper, or an alloy including these metals as the components.

A rotor shaft 113 is provided at the center of this rotating body 103. The rotor shaft 113 is supported afloat and has the position thereof controlled by, for example, a so-called five-axis control magnetic bearing.

An upper radial electromagnet 104 has four electromagnets that are arranged in pairs along an X-axis and a Y-axis, which are coordinate axes of the rotor shaft 113 in the radial direction and are orthogonal to each other. An upper radial sensor 107 configured by four electromagnets is provided in the vicinity of, and corresponding to, the upper radial electromagnets 104. This upper radial sensor 107 is configured to detect a radial displacement of the rotating body 103 and to send the detected displacement signal to a control device which is not shown.

Based on the detected displacement signal of the upper radial sensor 107, the control device controls excitation of the upper radial electromagnet 104 through a compensating circuit having a PID adjustment function, and adjusts an upper radial position of the rotor shaft 113.

The rotor shaft 113 is formed of a high permeability material (such as iron) or the like, and is attracted by the magnetic force of the upper radial electromagnet 104. Such adjustment is performed in an X-axis direction and a Y-axis direction independently.

Furthermore, a lower radial electromagnet 105 and a lower radial sensor 108 are disposed in the same manner as the upper radial electromagnet 104 and the upper radial sensor 107, adjusting a lower radial position of the rotor shaft 113 as with the upper radial position thereof.

In addition, axial electromagnets 106A, 106B are arranged, vertically sandwiching a disc-shaped metal disc 111 provided in a lower portion of the rotor shaft 113. The metal disc 111 is made of a high permeability material such as iron. An axial sensor, not shown, is provided to detect an axial displacement of the rotor shaft 113, and an axial displacement signal corresponding to the axial displacement is sent to the control device, which is not shown.

In addition, based on this axial displacement signal, excitations of the axial electromagnets 106A, 106B are controlled through the compensating circuit of the control device that has a PID adjustment function. The magnetic force of the axial electromagnet 106A and the magnetic force of the axial electromagnet 106B attract the metal disc 111 upward and downward, respectively.

In this manner, the control device appropriately adjusts the magnetic forces of the axial electromagnets 106A, 106B acting on the metal disc 111, magnetically levitates the rotor shaft 113 in the axial direction and holds the rotor shaft 13 in the space in a non-contact manner.

A motor 121 has a plurality of magnetic poles that are circumferentially arranged so as to surround the rotor shaft 113. Each of the magnetic poles is controlled by the control device, not shown, so as to rotationally drive the rotor shaft 113 using an electromagnetic force acting between each magnetic pole and the rotor shaft 113.

A plurality of stator blades 123a, 123b, 123c etc. are arranged, with a small gap from the rotor blades 102a, 102b, 102c, etc. The stator blades 123 are made of a metal such as aluminum, iron, stainless steel, copper, or an alloy including these metals as the components. In order to transfer molecules of exhaust gas downward by collision, the rotor blades 102a, 102b, 102c etc. are each inclined at a predetermined angle from a plane perpendicular to the axis of the rotor shaft 113.

Similarly, the stator blades 123 are each inclined at a predetermined angle from a plane perpendicular to the axis of the rotor shaft 113 and are arranged, directed toward the inside of the outer cylinder 127, so as to alternate with the stages of the rotor blades 102.

The ends on one side of the stator blades 123 are supported while being fitted and inserted between a plurality of stacked stator blade spacers 125a, 125b, 125c, etc.

The stator blade spacers 125 are each a ring-shaped member and made of a metal such as aluminum, iron, stainless steel, copper, or an alloy including these metals as the components.

The outer cylinder 127 is fixed to an outer circumference of the stator blade spacers 125, with a small gap therebetween. A base portion 129 is disposed at a bottom portion of the outer cylinder 127, and a threaded spacer 131 is disposed between a lower portion of the stator blade spacers 125 and the base portion 129. An outlet port 133 is formed at a lower portion of the threaded spacer 131 in the base portion 129, the outlet port 133 being communicated to the outside.

The threaded spacer 131 is a cylindrical member made of a metal such as aluminum, copper, stainless steel, iron, or an alloy including these metals as the components, and has a plurality of helical thread grooves 131a stamped on an inner circumferential surface thereof.

A helical direction of the thread groove 131a is the direction in which the molecules of the exhaust gas are transferred toward the outlet port 133 when the molecules move in the direction of rotation of the rotating body 103.

A rotating cylinder 102d hangs down at the lowermost portion of the rotating body 103 following the rotor blades 102a, 102b, 102c etc. An outer circumferential surface of this rotating cylinder 102d is in a cylindrical shape, bulges toward an inner circumferential surface of the threaded spacer 131, and is brought close to the inner circumferential surface of the threaded spacer 131, with a predetermined gap therebetween.

The base portion 129 is a disk-shaped member configuring a base of the turbomolecular pump 100, and is generally made of a metal such as iron, aluminum, stainless steel, or copper.

According to this configuration, when the rotating body 103 is driven by the motor 121 to rotate together with the rotor shaft 113, the exhaust gas from the chamber is sucked through the inlet port 101 by the actions of the rotor blades 102 and the stator blades 123.

The exhaust gas that is sucked through the inlet port 101 passes between the rotor blades 102 and the stator blades 123 and is transferred to the base portion 129.

The exhaust gas transferred to the threaded spacer 131 is sent to the outlet port 133 while being guided by the thread grooves 131a.

Figure 2:
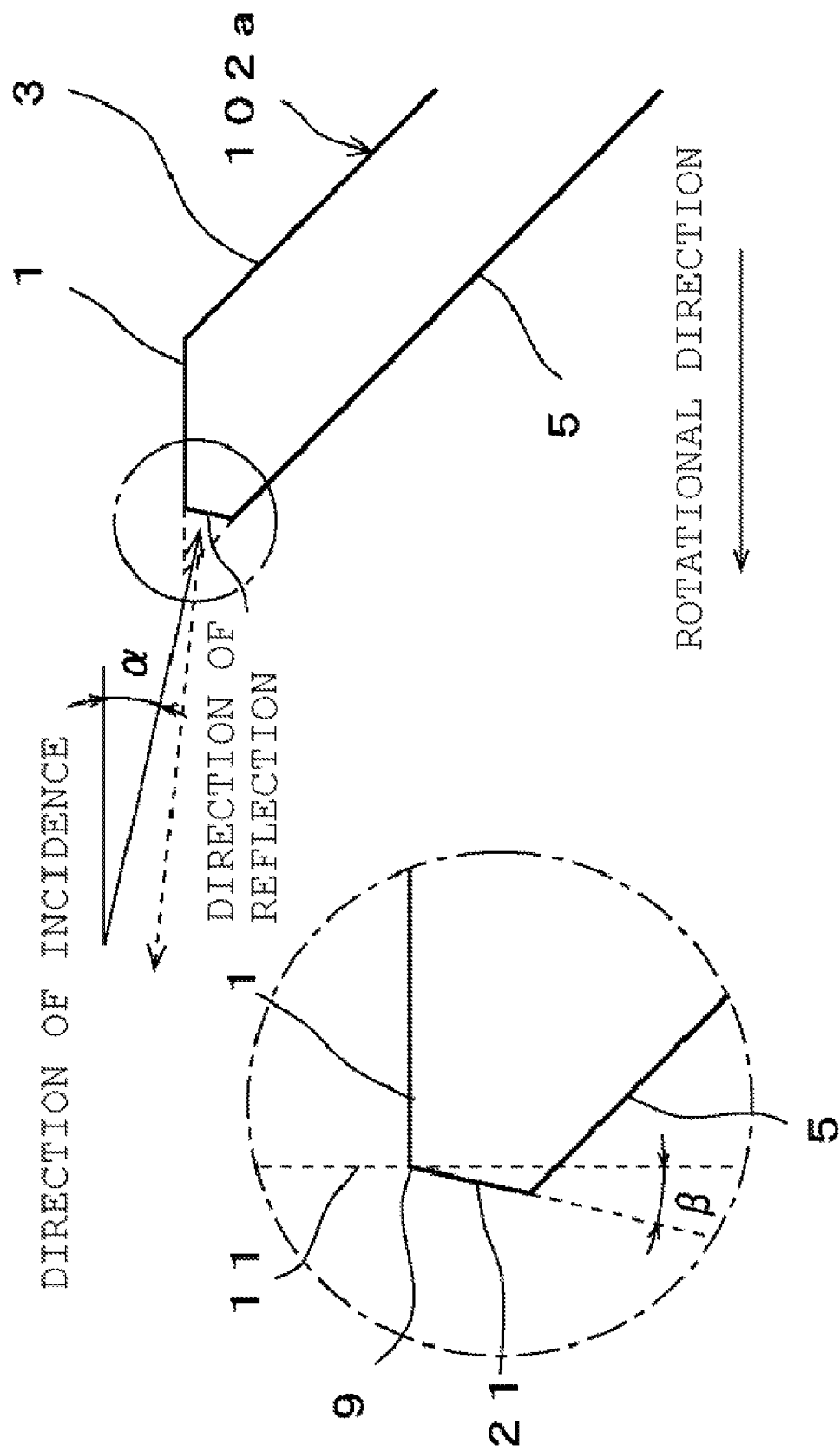
FIG. 2 is a diagram showing a tip end section of a blade of a rotor blade.

FIG. 2 shows a tip end portion of the blade of one of the rotor blades 102a disposed at the uppermost stage of the rotating body 103. For the purpose of explanation, FIG. 2 also shows an enlargement of the tip end portion surrounded by a circle of a chain line.

The tip end portion of the blade of the rotor blade 102a in the rotational direction is provided with a chamfered surface 21 which is formed at a predetermined angle, in order to prevent burrs from occurring at the tip end portion and to prevent cutting hands at the time of assembly.

Figure 3:
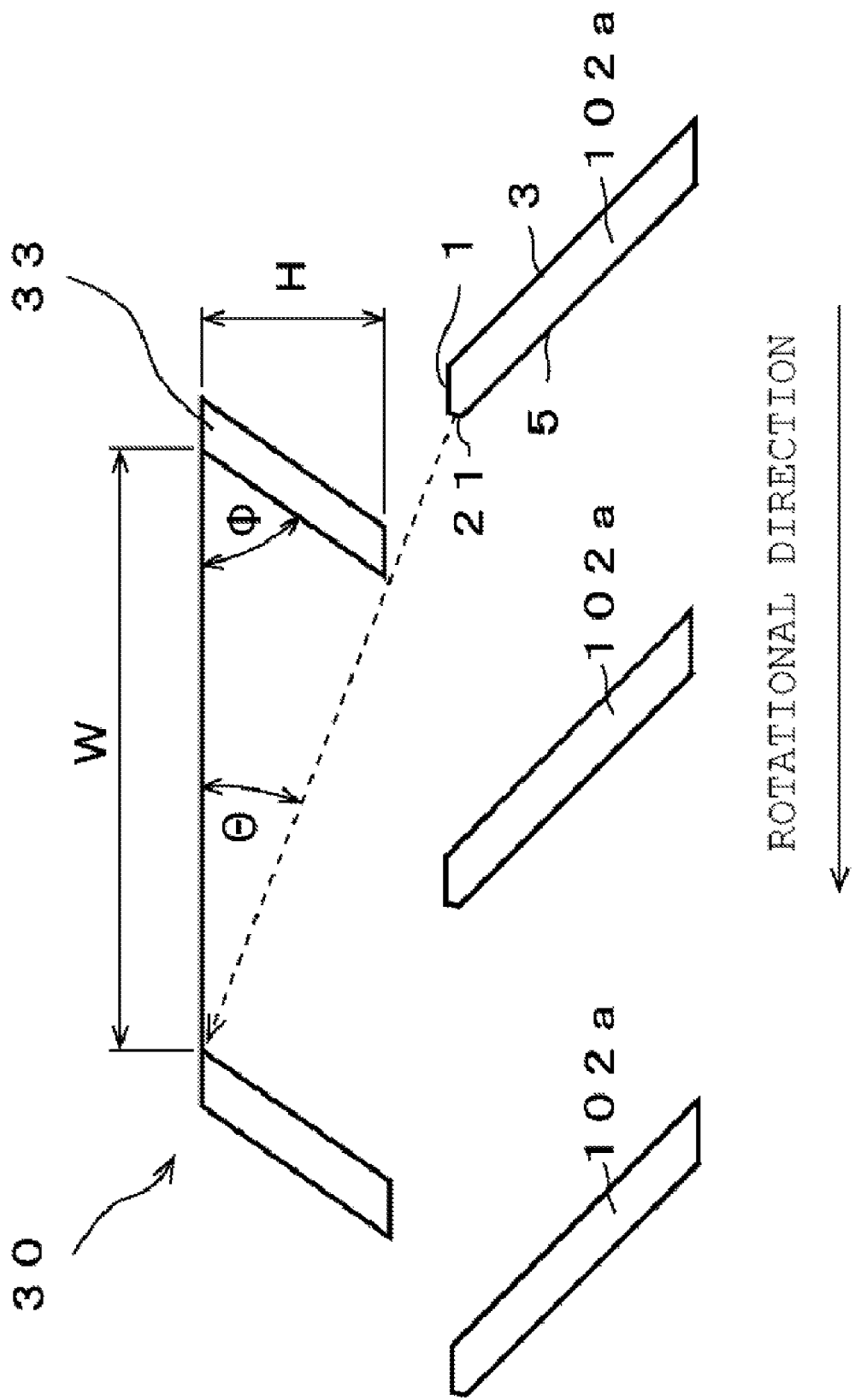
FIG. 3 is an exploded side view showing rotor blades and a reflection mechanism.

As shown in FIG. 1, a reflection mechanism 30 is disposed above this rotor blade 102a. This reflection mechanism 30 is provided in such a manner as to be detachable from an inner wall of the inlet port 101 by a sealing 31. FIG. 3 shows an exploded side view of the rotor blades 102a and the reflection mechanism 30, taken along an imaginary line, the dotted line A shown in FIG. 1 and cut open by the cut plane. In the reflection mechanism 30, inclined plates 33, inclined at a predetermined angle, are arranged radially in the radial direction from a central disc portion 35. However, for the purpose of explanation, in FIG. 1 the number of inclined plates 33 is less than the actual number of inclined plates.

In this configuration, first, a condition for preventing the particle, which is reflected on the chamfered surface 21 of a rotor blade 102a, from re-colliding with the rear surface of the rotor blade 102a located forward in the rotational direction, is described with reference to FIG. 2. In FIG. 2, the incidence angle of the particle is defined as an angle α, and an angle that is formed by the chamfered surface 21 of each rotor blade 102a and the imaginary line 11 passing through a rotational direction-side tip end point 9 of a horizontal surface 1 and drawn parallel to the rotating shaft, is defined as an inclination angle β of the chamfered surface 21.

In this case, the particle is reflected exactly in the horizontal direction under the condition that the inclination angle β of the chamfered surface 21 is equal to α/2. Because the chamfered surface 21 is positioned at the uppermost end of each rotor blade 102a in terms of the arrangement of the rotor blades 102a shown in FIG. 3, it is clear that making the angle β slightly larger than α/2 can prevent the particle from re-colliding with the rear surface of the rotor blade 102a located forward in the rotational direction. Therefore, assuming that the incidence angle of the particle is 0 to 20 degrees, it is preferred that the inclination angle β of the chamfered surface 21 of each rotor blade 102a gradually open wide by 0 to 10 degrees toward the downstream side in the rotational direction.

Figure 4:
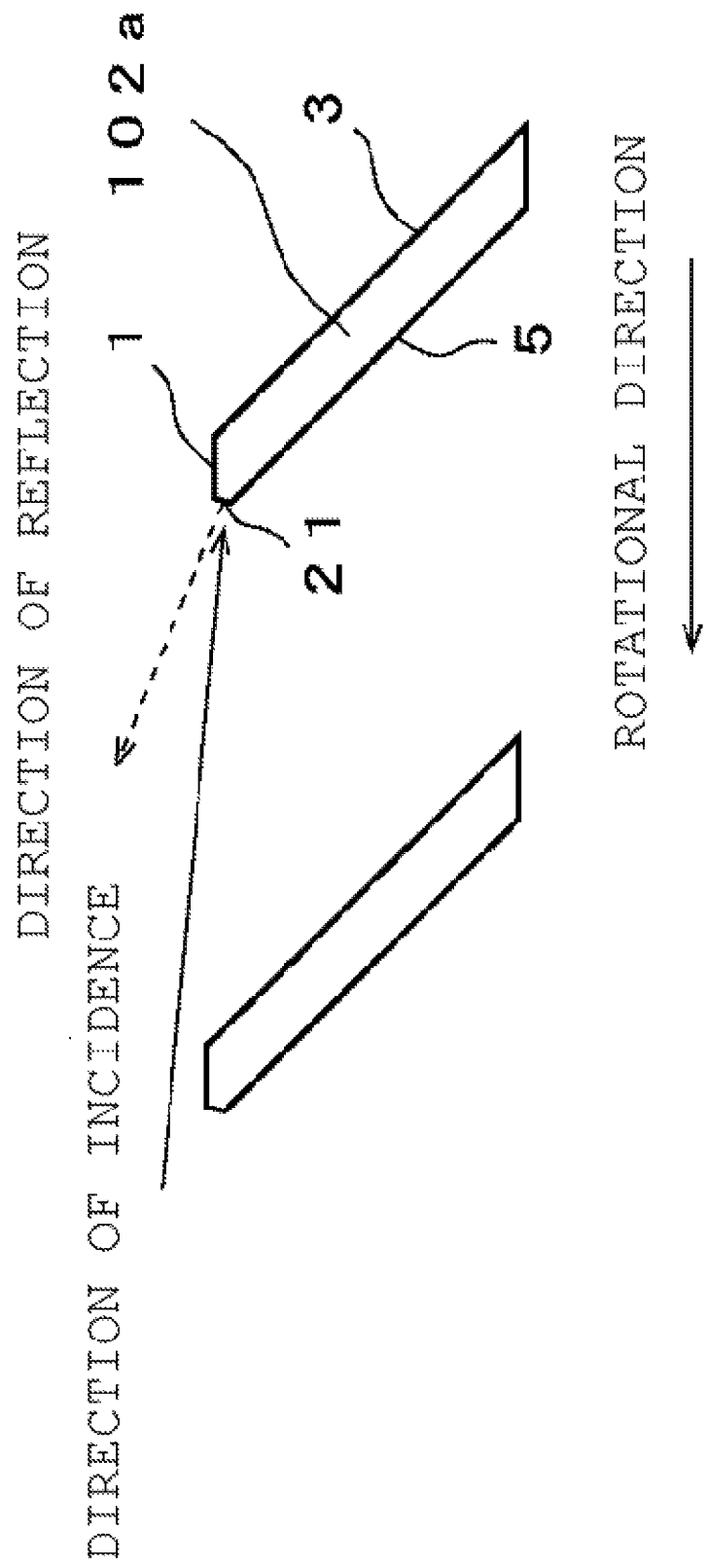
FIG. 4 is a diagram showing how a particle entering a chamfered surface of the rotor blade is reflected.

Specifically, since the chamfered surface 21 has a surface facing the inlet port 101 side, this chamfered surface 21 is exposed to the inlet port 101 side. As a result of inclining the chamfered surface 21 at an angle slightly larger than half the incidence angle of the particle in this manner, the particle enters the chamfered surface 21 of the rotor blade 102a and is then reflected slightly toward the upstream side from the horizontal direction, as shown in FIG. 4.

In this case, it is preferred that all of the particles enter this chamfered surface 21. A theoretical condition that is required for all of the particles to enter the chamfered surface 21 as described above is as shown by Formula 1.

$$L = d \times v1/v2$$ [Formula 1]

Figure 5:
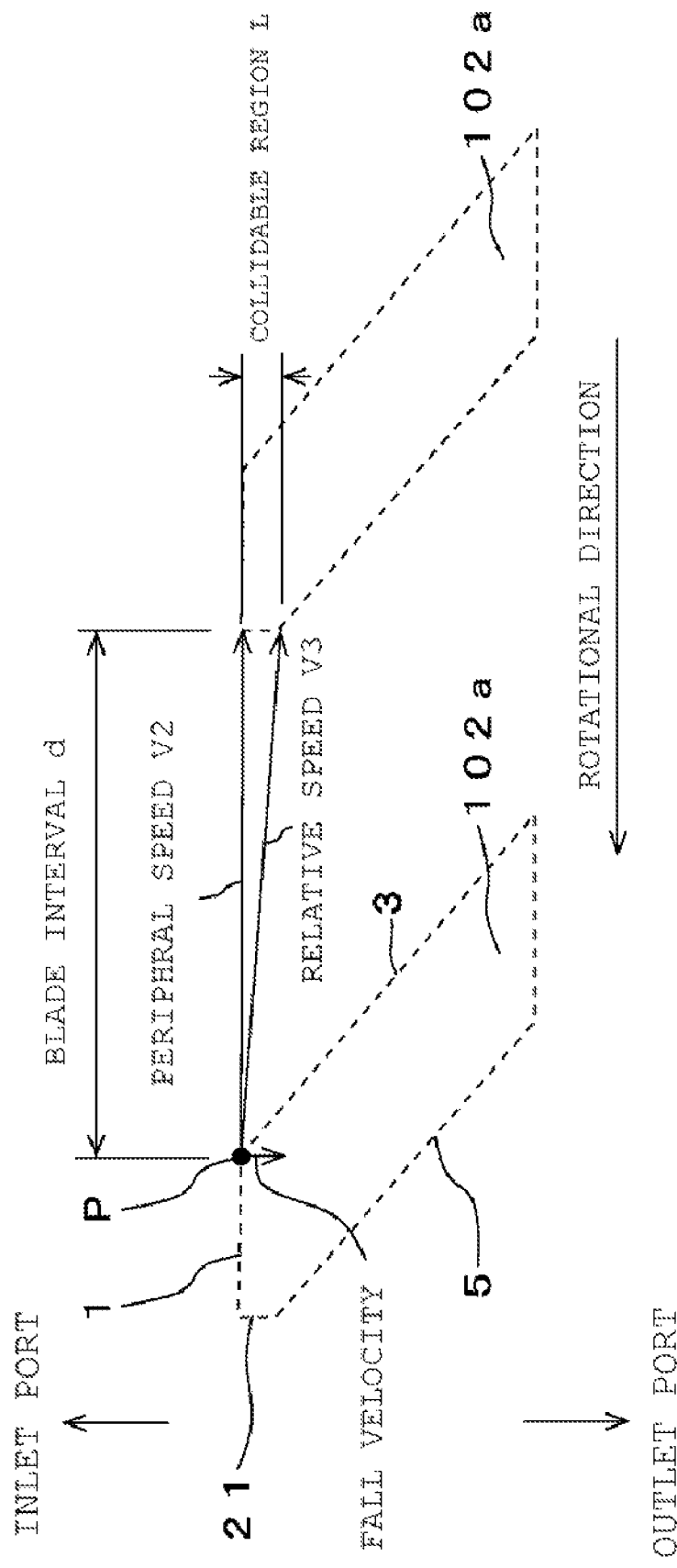
FIG. 5 is a diagram showing how the particle collides with a range of a collidable region.

In other words, given that d represents an interval between the blades of adjacent rotor blades 102a, v2 the speed of movement (peripheral speed) of the rotor blades 102a, and v1 a fall velocity of the particle, the particle collides within a range of a collidable region L, as shown in FIG. 5. Therefore, by determining the amount of scraping of the chamfered surface 21 (equivalent to the height of the chamfered surface 21) on the basis of Formula 1, the axial height of the chamfered surface 21 is minimized, keeping the impact of the chamfered surface 21 on the exhaust performance minimum.

On the other hand, as shown in FIG. 3, the particle reflected on the chamfered surface 21 of the rotor blade 102 collides with the corresponding inclined plate 33 of the reflection mechanism 30, and the particle that is consequently re-reflected needs to fall in the downstream direction. The width W an interval between the inclined plates 33 that is required for the particle to fall in the downstream direction is expressed by Formula 2 where Φ represents the inclination angle of the inclined plate 33, H represents the axial height of the inclined plate 33, and θ represents the reflection angle of the particle. It should be noted that the width W of the interval between the inclined plates 33 is a peripheral length obtained by cutting the inclined plates 33 along the imaginary line, the dotted line A shown in FIG. 1, and cutting open the inclined plates 33 by the cut plane.

$$W = H \times (1/\tan \theta + 1/\tan \Phi)$$ [Formula 2]

By setting the width W of the interval between the inclined plates 33 in this manner, the interval between the inclined plates 33 can be kept sufficiently small so that the reflected particle does not pass through the inclined plates 33. As long as the interval between the inclined plates 33 can be optimized, the impact on the exhaust performance due to the installation of the inclined plates 33 can be minimized.

In a case where the length of the diameter for the imaginary line shown by the dotted line A of FIG. 1 is reduced, the width W of the interval between the inclined plates 33, which is the peripheral length of the imaginary line, becomes short as well. In this case, it is clear from Formula 2 that the axial height H of the inclined plates 33 can be reduced. Therefore, in the side view of the inclined plates 33 shown in FIG. 1, the height of the inclined plates 33 becomes gradually short from the casing side toward the inside.

Since the height of the inclined plates 33 can become gradually short from the casing side toward the inside as described above, the impact on the exhaust performance due to the installation of the inclined plates 33 can be minimized.

Accordingly, the particle entering the chamfered surface 21 of the rotor blade 102 can be concentrated on the chamfered surface 21, and the particle reflected on the chamfered surface 21 can be caused to collide securely with the corresponding inclined plate 33 of the reflection mechanism 30 and thereafter fall toward the downstream side. Re-collision with the rear surface of the forward blade, which occurs in the prior art, can be prevented, thereby securely causing the particle to be reflected toward the reflection mechanism 30. Consequently, the particle can be prevented from exiting through the inlet port 101 to flow back toward the chamber. As a result, when using the turbomolecular pump 100 in a semiconductor manufacturing apparatus, contamination of wafers caused by the particle can be solved, improving the yield of manufacturing semiconductors.

In addition, because the direction of reflection of the particle can be contained in a narrow range somewhat above the horizontal direction, not only is it possible to achieve the minimum size of the reflection mechanism 30, but also the impact on the exhaust performance can be minimized.

Note that the inclined plates 33 preferably face the rotor blades 102*a* and are installed in the vicinity of the rotor blades 102*a*. More specifically, in FIG. 1, a gap that is approximately equivalent to the height of the gap between the rotor blades 102*a* and the stator blades 123*a* is formed between the inclined plates 33 and the rotor blades 102*a*. In other words, the inclined plates 33 are provided with the function of the stator blades 123. As a result, the same exhaust action as the one occurring between the rotor blades 102*a*, 102*b*, 102*c* etc. and the stator blades 123*a*, 123*b*, 123*c* etc. can be caused between the rotor blades 102*a* and the inclined plates 33. Therefore, the deterioration of the exhaust performance caused due to the placement of the inclined plates 33 can be reduced.

Note that although above has described that the reflection mechanism 30 is provided in such a manner as to be detachable from the inner wall of the inlet port 101 by means of the sealing 31, the reflection mechanism 30 may be detachable by means of a screw or the like in place of the sealing 31. This enables easy replacement of a dirty reflection mechanism 30 without disassembling the turbomolecular pump.

Furthermore, it is preferred that the inclined plates 33 of the reflection mechanism 30 not be installed in the range inside the roots of the blades of the rotor blades 102*a* and that the range be simply configured as the disc-shaped central disc portion 35.

Figure 6:
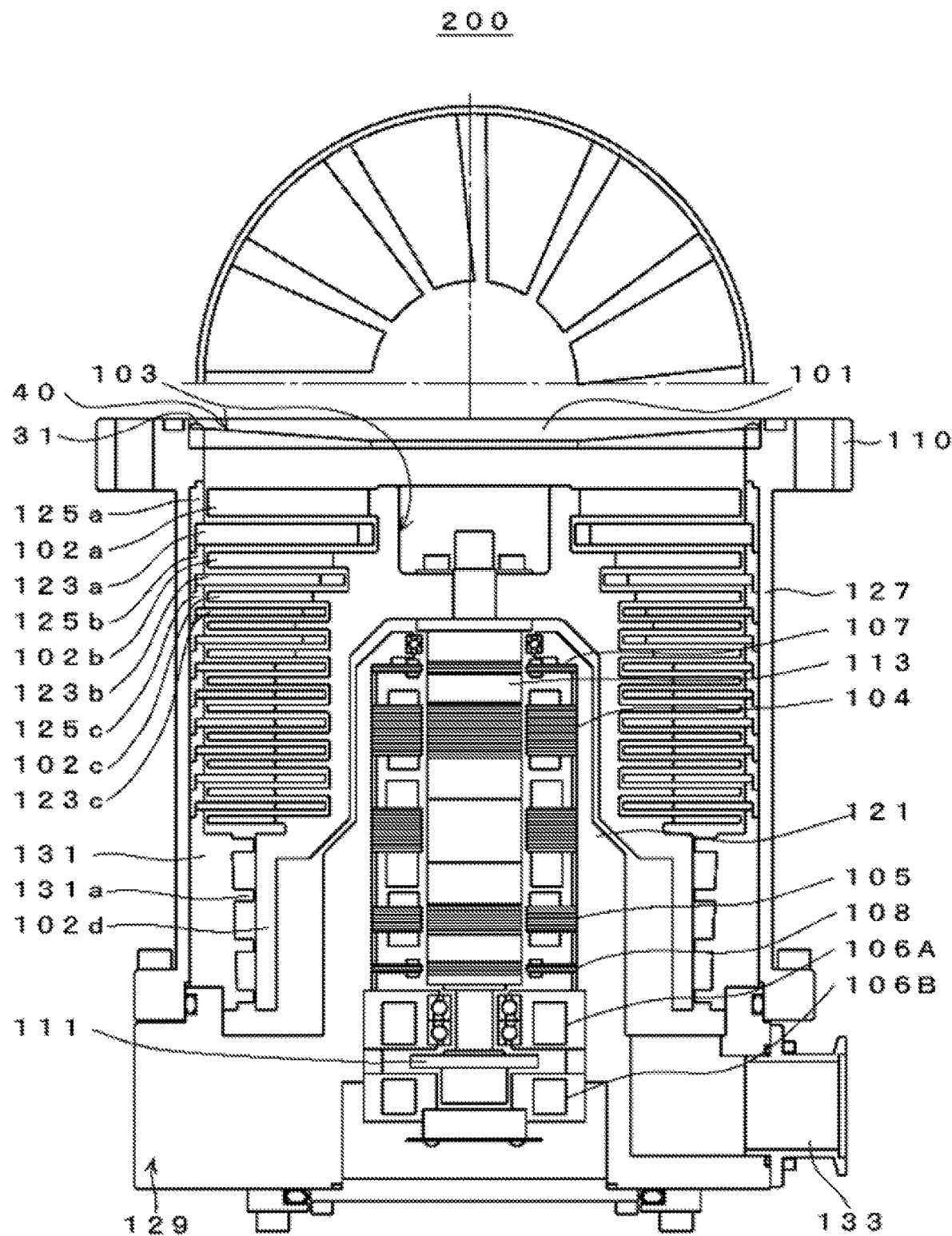
FIG. 6 is a configuration diagram of a turbomolecular pump according to a second embodiment of the present invention.

A second embodiment of the present invention is described next. FIG. 6 shows a configuration diagram of the second embodiment of the present invention. Note that the same reference numerals as those shown in FIG. 1 are used in FIG. 6, thereby omitting the descriptions of the corresponding components accordingly.

A reflection mechanism 40 of a turbomolecular pump 200 shown in FIG. 6 is provided in such a manner as to be detachable from an upper portion of the inner wall of the inlet port 101 by the sealing 31. In a case where the position for installing the reflection mechanism 40 is made higher than that of the reflection mechanism 30 of the first embodiment, the angle of the chamfered surface 21 of each rotor blade 102*a* with respect to the imaginary line 11, shown in FIG. 2, needs to be made larger than that of the first embodiment. In this case as well, the angle of the chamfered surface 21 with respect to the imaginary line 11 shown in FIG. 2 may only need to be set so as to allow the particle to enter toward the reflection angle θ of the particle as shown in FIG. 3. As a result, flexibility in the design can be obtained with regard to selecting the position for installing the reflection mechanism 40.

Figure 7:
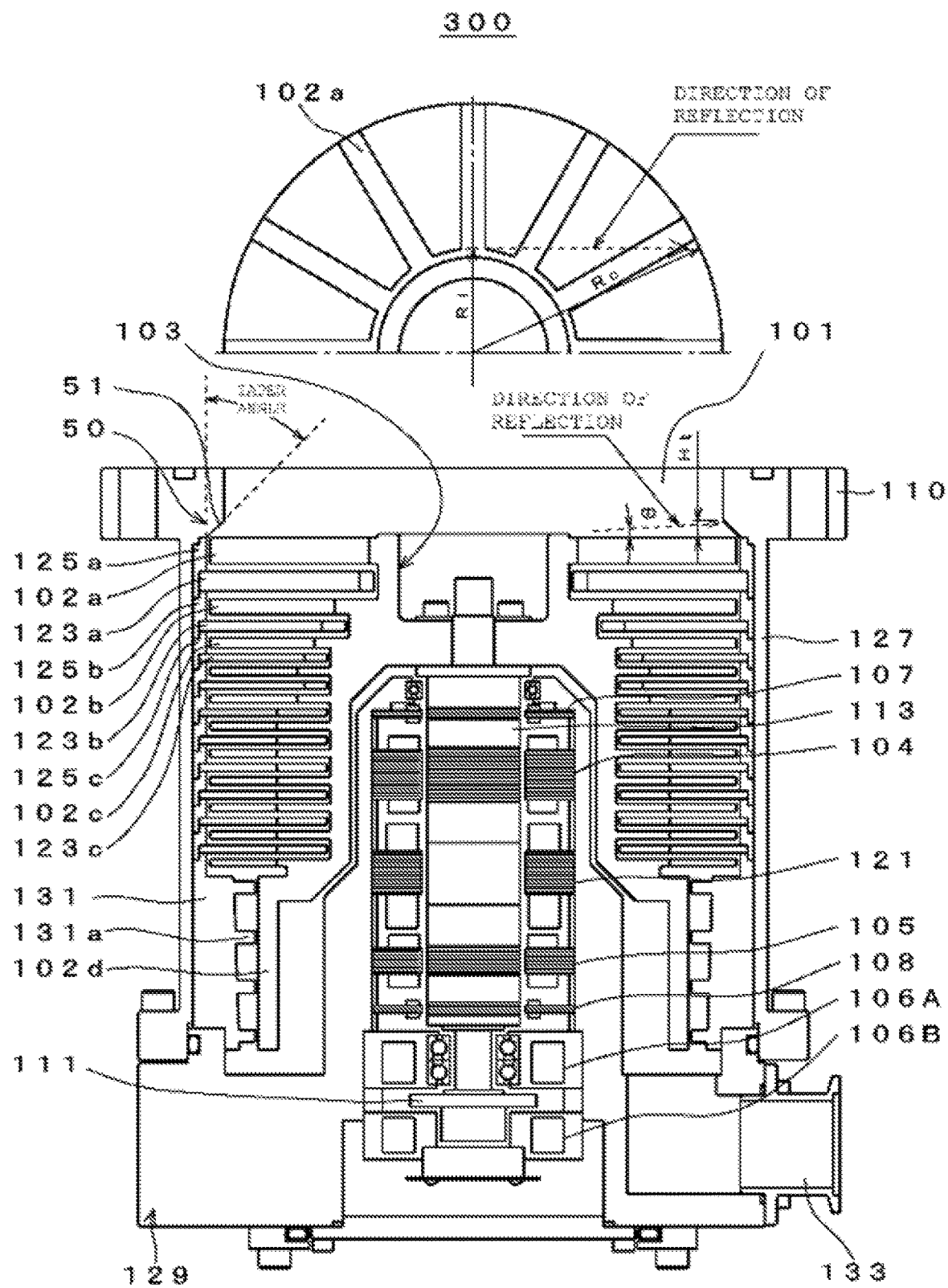
FIG. 7 is a configuration diagram of a turbomolecular pump according to a third embodiment of the present invention.

A third embodiment of the present invention is described next. FIG. 7 shows a configuration diagram of the third embodiment of the present invention. Note that the same reference numerals as those shown in FIG. 1 are used in FIG. 7, thereby omitting the descriptions of the corresponding components accordingly.

In a turbomolecular pump 300 shown in FIG. 7, a reflection mechanism 50 is formed in a lower portion of an inner circumferential portion of the inlet port 101, in an inner section of the flange 110 provided at the upper end of the outer cylinder 127. This reflection mechanism 50 is also formed on a conical wall 51 which has a tapered surface in such a manner that the inner diameter thereof gradually expands toward the downstream side. Note that the structure of the rotor blades 102*a* is the same as that described in the first embodiment.

According to this configuration, since the chamfered surface 21 of each rotor blade 102*a* has a surface that obliquely faces the inlet port 101 as shown in FIG. 2, the particle enters the chamfered surface 21 of each rotor blade 102*a* as shown in FIG. 4 and is then reflected slightly toward the upstream side with respect to the direction in which the particle enters.

In FIG. 7, it is preferred that the relation expressed by Formula 3 be established between the height Ht of the tapered section and the reflection angle θ, the distance Ri and the distance Rc, where Ht represents the height of the tapered section, θ represents the reflection angle of the particle, Ri represents the horizontal distance from the center of the rotating shaft to the root of the blade of each rotor blade 102*a*, and Rc represents the horizontal distance between the center of the rotating shaft and the conical wall 51.

$$Ht > (Rc^2 - Ri^2)^{1/2} \times \tan\theta \qquad \text{[Formula 3]}$$

According to these settings, the range of collision of the particle that is reflected on the chamfered surface 21 of each rotor blade 102*a* is contained in the tapered section. In addition, it is preferred that the angle formed between the tapered section of the conical wall 51 and the axial direction be 45 degrees or more, the angle being a taper angle shown in FIG. 7. As long as the taper angle is 45 degrees or more, the particle having collided with the conical wall 51 is reflected securely in the downstream direction.

According to the foregoing configuration of the third embodiment, the particle reflected on the chamfered surface 21 of each rotor blade 102*a* can securely be caused to collide with the tapered surface of the conical wall 51 and thereafter fall toward the downstream side. Consequently, the particle can be prevented from exiting through the inlet port 101 to flow back toward the chamber.

Figure 8:
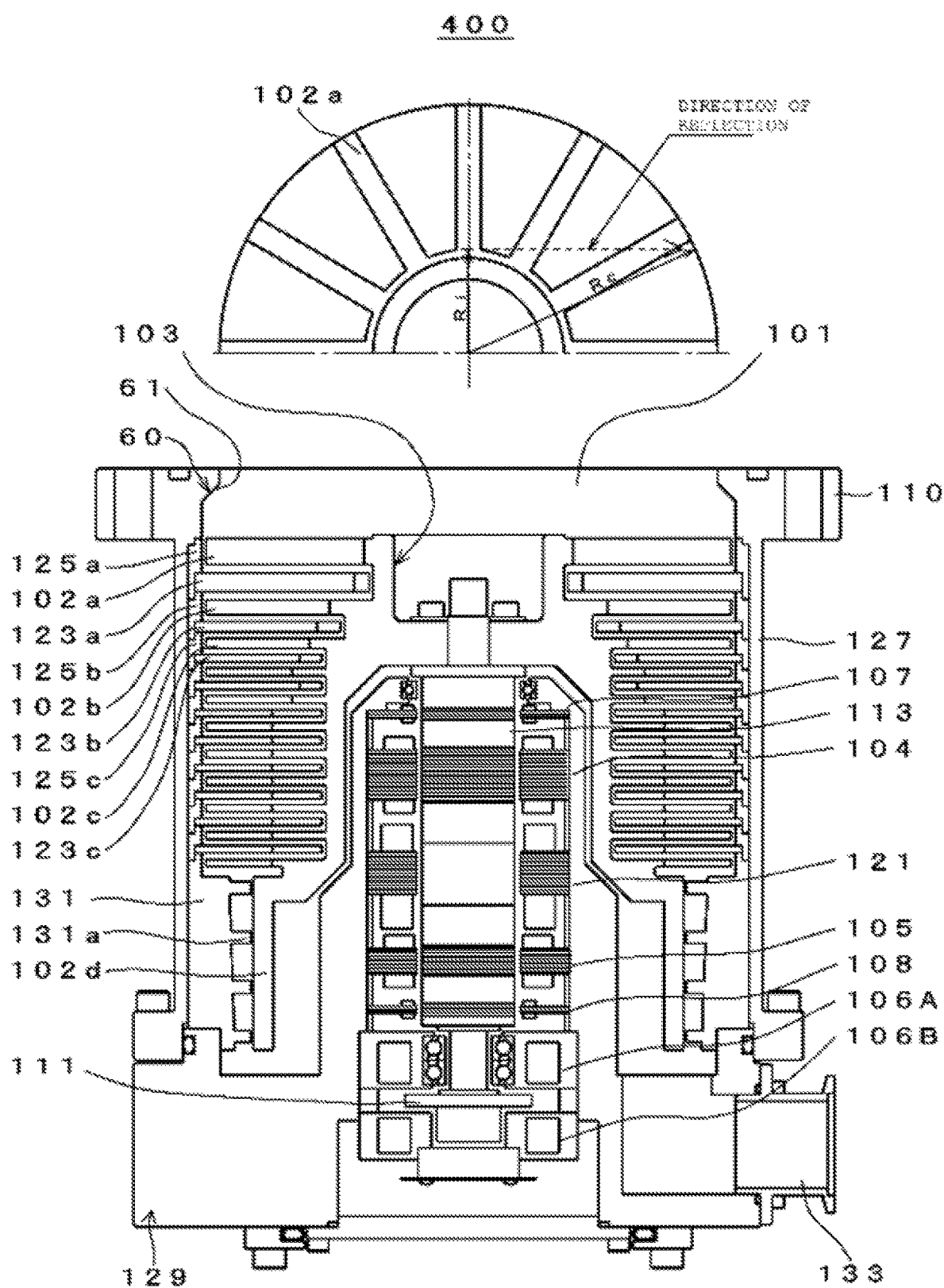
FIG. 8 is a configuration diagram of a turbomolecular pump according to a fourth embodiment of the present invention.

A fourth embodiment of the present invention is described next. FIG. 8 shows a configuration diagram of the fourth embodiment of the present invention. Note that the same reference numerals as those shown in FIG. 1 are used in FIG. 8, thereby omitting the descriptions of the corresponding components accordingly.

In a turbomolecular pump 400 shown in FIG. 8, a conical wall 61 of a reflection mechanism 60 is formed in the upper portion of the inner wall of the inlet port 101. In a case where the position for disposing the conical wall 61 is made higher than that of the conical wall 51 of the third embodiment, the angle of the chamfered surface 21 of each rotor blade 102*a* with respect to the imaginary line 11, shown in FIG. 2, needs to be made larger than that of the first embodiment. In this case as well, the angle of the chamfered surface 21 with respect to the imaginary line 11 may only need to be set so as to allow the particle to enter toward the reflection angle θ of the particle as shown in FIG. 7. As a result, flexibility in the design can be obtained with regard to selecting the position for disposing the conical wall 61.

Figure 9:
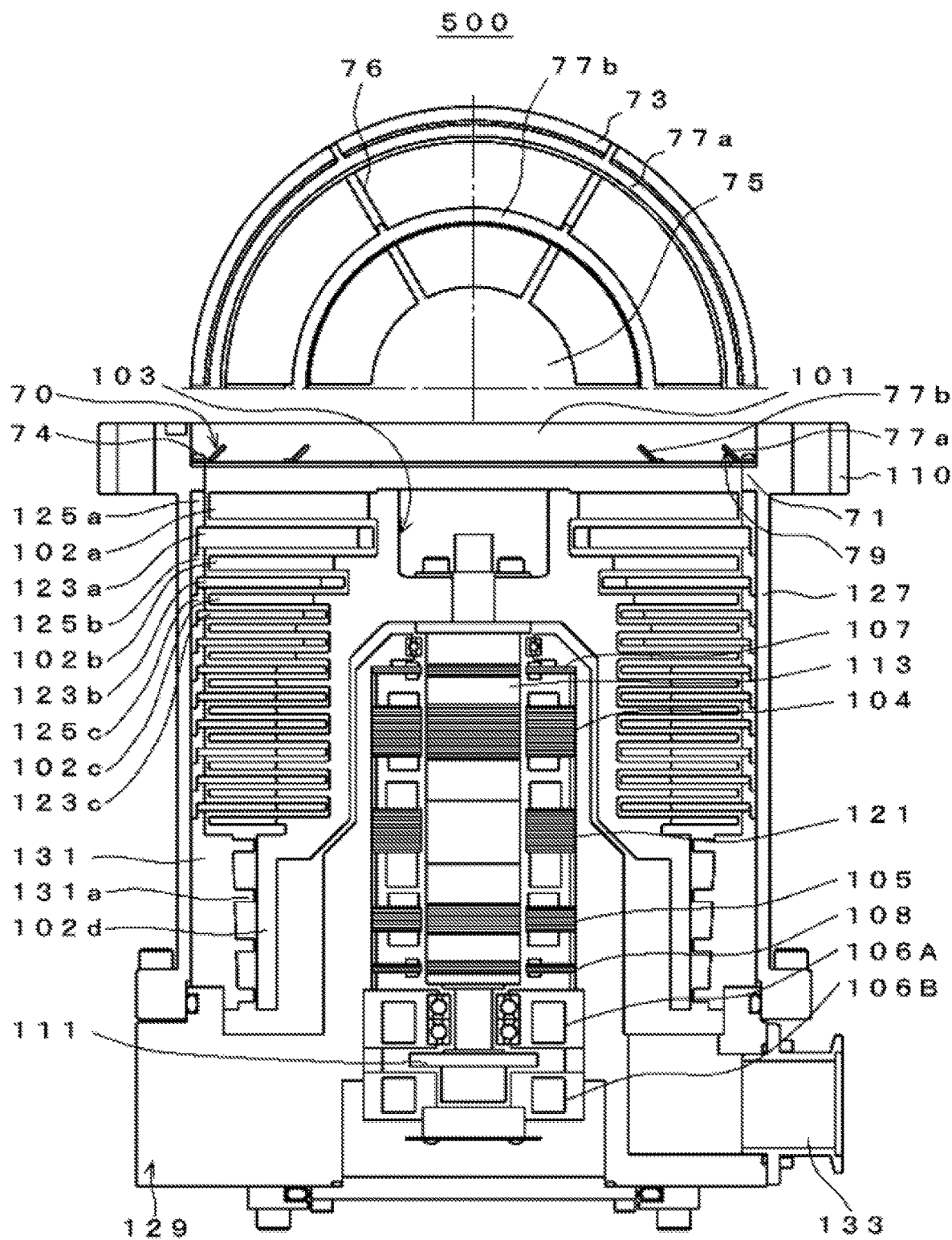
FIG. 9 is a configuration diagram of a turbomolecular pump according to a fifth embodiment of the present invention.

A fifth embodiment of the present invention is described next. FIG. 9 shows a configuration diagram of the fifth embodiment of the present invention. Note that the same reference numerals as those shown in FIG. 1 are used in FIG. 9, thereby omitting the descriptions of the corresponding components accordingly.

According to the fifth embodiment of the present invention, in place of the conical wall formed with respect to the outer cylinder 127 of the third embodiment, a turbomolecular pump 500 shown in FIG. 9 has an annular baffle, an independent member which is attached inside of the inlet port 101, as a backflow prevention structure.

A protruding portion 71 is formed circumferentially on an inner circumferential wall of the outer cylinder 127. A circular outer annular portion 73 of a reflection mechanism 70 is fixed on the protruding portion 71 by screws 74. A disc-shaped central disc portion 75 is disposed at the center of the reflection mechanism 70. Supporting members 76 extend radially from this central disc portion 75 to the outer annular portion 73. The supporting members 76 are fixedly mounted onto the outer annular portion 73.

Around the central disc portion 75, a circular baffle 77*a*, a longitudinal cross section of which forms an inverted "V," is attached on top of the supporting members 76. On the inside of the baffle 77*a* is formed an inclined surface 79, the inner diameter of which gradually expands toward the downstream side. The inclined surface 79 of the baffle 77*a* corresponds to the tapered surface of the conical wall 51 of the third embodiment, and this inclined surface 79 acts on the particle in the same way as the tapered surface of the conical wall 51 of the third embodiment.

Specifically, the baffle 77*a* alone can function in the same manner as the conical wall 51 of the third embodiment, but, for example, adding a circular baffle 77*b* to the middle of the supporting members 76 as shown in FIG. 9 can reduce the axial heights of the baffle 77*a* and the baffle 77*b* to half the lengths thereof. The reason of this is because the particle that scatters at the refection angle θ in FIG. 7 can be re-reflected within the range of a height Ht/2 due to the baffle 77*b* disposed at the middle of the supporting members 76.

As a result, the height of the turbomolecular pump 500 can be set small.

Note that the shapes of the baffles 77 are not limited to a circular shape; the baffles 77 can be shaped into a polygon in a circumferential manner. In this case, the baffles are formed linearly between the adjacent supporting members 76 instead of arc-like as in the baffles 77*a*, 77*b*.

Figure 10:
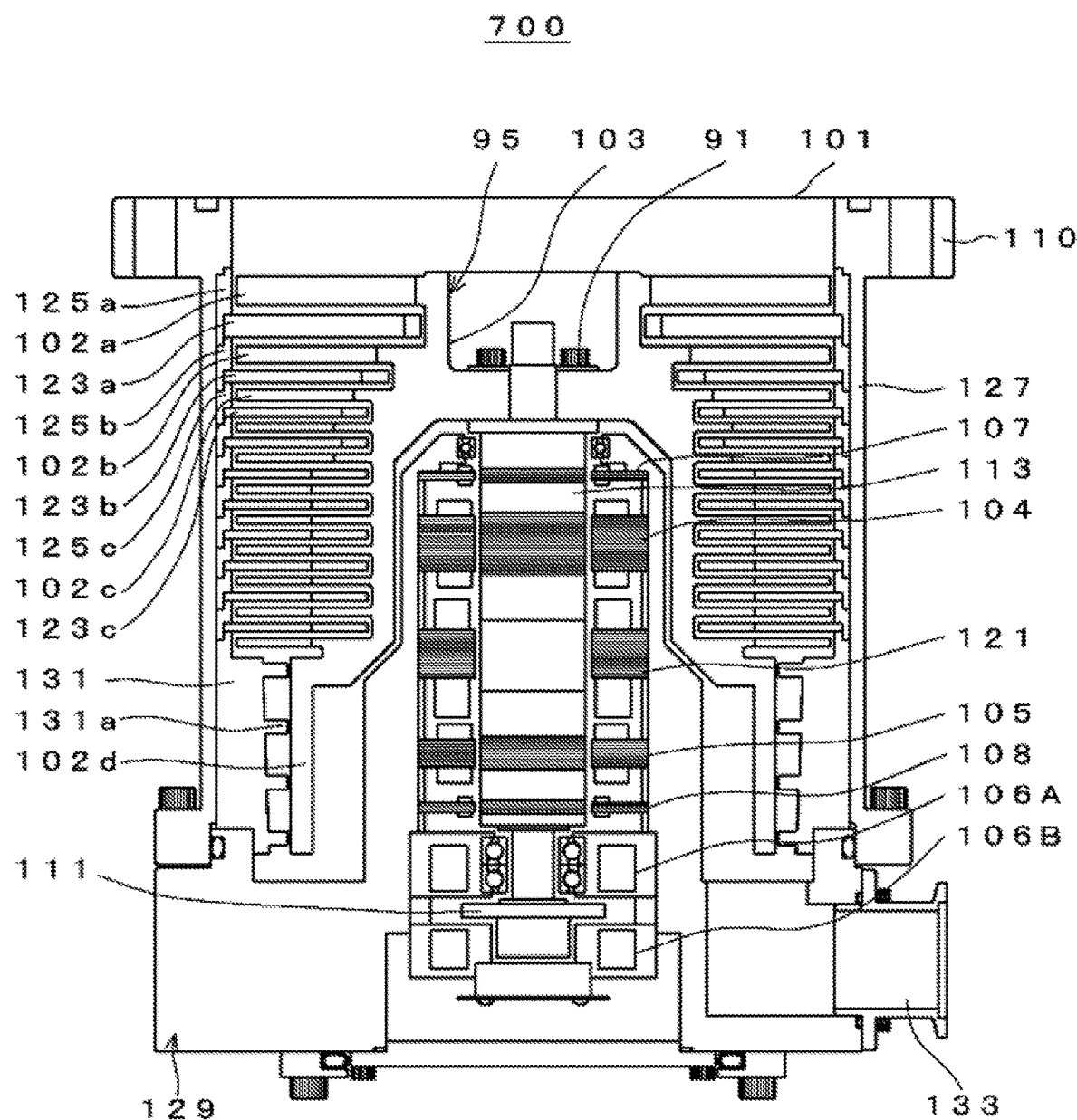
FIG. 10 is a configuration diagram of a conventional turbomolecular pump.

A sixth embodiment of the present invention is described next. First of all, FIG. 10 shows a configuration diagram of a conventional turbomolecular pump 700. Note that the same reference numerals as those shown in FIG. 1 are used in FIG. 10, thereby omitting the descriptions of the corresponding components accordingly.

Figure 11:
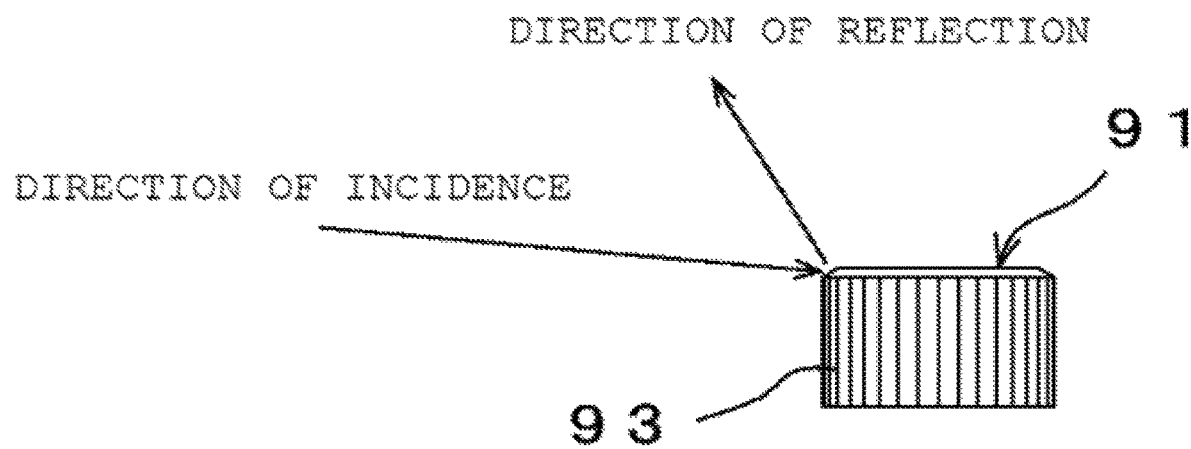
FIG. 11 is an enlarged view of a bolt section.

As shown in FIG. 10, the rotating body 103 is fastened to the rotor shaft 113 by a plurality of bolts 91 arranged around the rotor shaft 113. FIG. 11 shows an enlarged view of one of the bolts 91. An outer circumference of the bolt 91 is indented in the axial direction, forming serrations 93.

A columnar recess 95 is formed at a top portion of the rotating body 103. The bolts 91 are arranged, at predetermined intervals, in the radial direction from the center of the rotor shaft 113, on a bottom surface of the recess 95. Therefore, the bolts 91 rotate about the center of the rotor shaft 113, bringing about a risk that the particle is reflected upward after entering in the direction of incidence shown in FIG. 11. The reflection of the particle is prominent at top edges of the bolts 91 but could happen at the serrations 93 as well.

Figure 12:
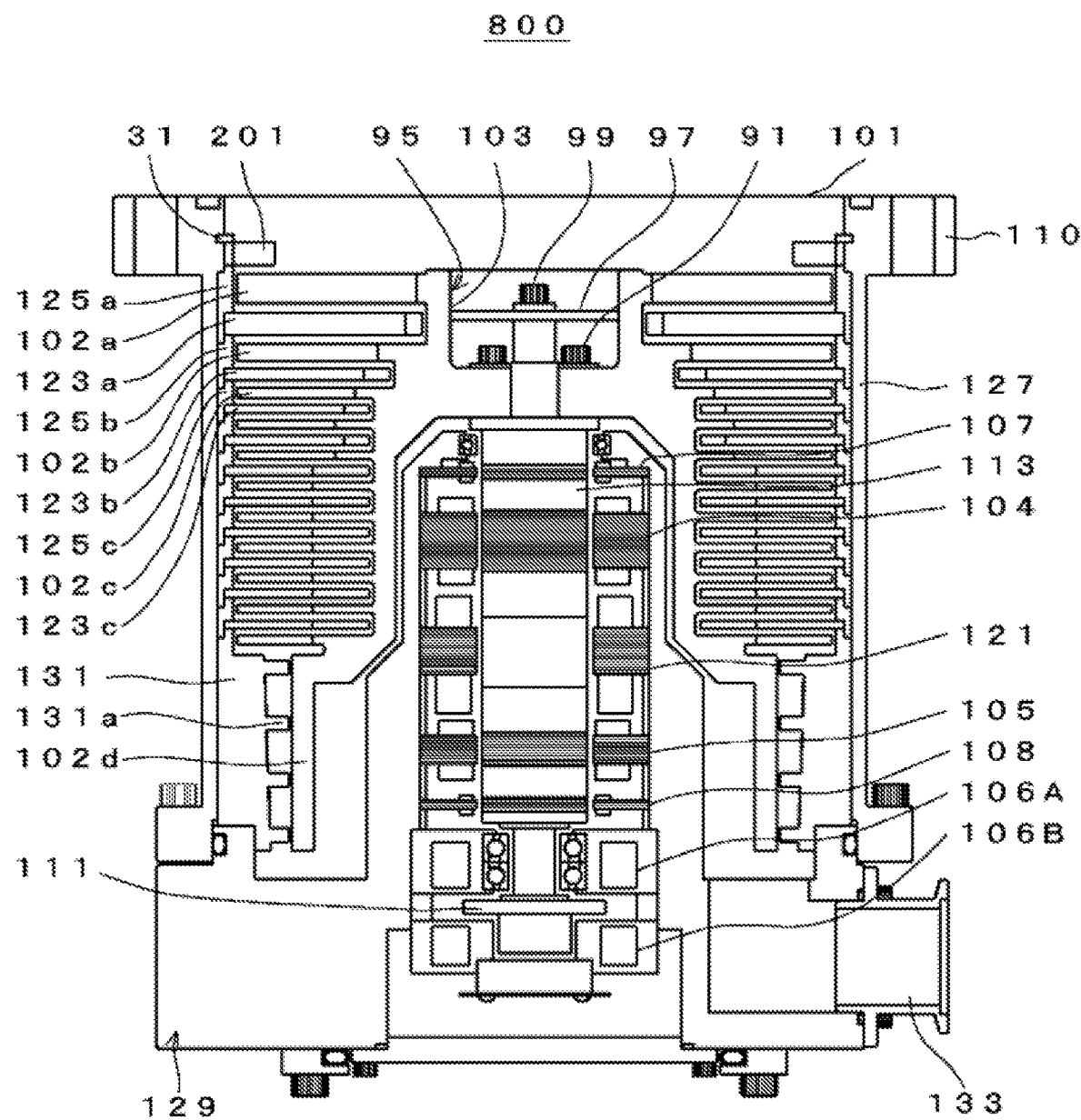
FIG. 12 is a configuration diagram of turbomolecular pumps according to sixth and seventh embodiments of the present invention.

For the purpose of inhibiting such negative effect, the sixth embodiment of the present invention employs the structure shown in a turbomolecular pump 800 of FIG. 12. Specifically, a cover plate 97 is disposed in a middle section of the height of the recess 95 of the turbomolecular pump 800, and this cover plate 97 is fastened to the rotor shaft 113 by a bolt 99. It is preferred that an outer circumference of the bolt 99 not be provided with serrations and therefore have a smooth surface with no roughness.

As a result of disposing this cover plate 97, the particle is blocked by the cover plate 97 and thus prevented from hitting the bolts 91. Therefore, the particle can be prevented from being reflected on the bolts 91 to flow back toward the chamber. Even if the particle hits the bolt 99, the section of the bolt 99 where the particle contacts is the smooth surface with no roughness that is radially close to the center of the rotor shaft 113. For this reason, the particle is not likely to be reflected on the bolt 99 to flow back toward the chamber.

The present embodiment has described that the cover plate 97 is disposed on the rotating body 103 side, but this function may be provided in the central disc portion 35 provided on the reflection mechanism 30 side as described in the first embodiment. In this case, even without the cover plate 97, by providing the central disc portion 35, the particle is not reflected on the bolts 91 to flow back toward the chamber.

The present embodiment has also described that the cover plate 97 is fastened to the rotor shaft 113 by the bolt 99, but the cover plate 97 may be fastened to the rotating body 103 by means of a bolt. Even in this case, placing the bolts can reduce the radial distance from the center of the rotor shaft 113, achieving the same effects as those of the present embodiment.

Figure 13:
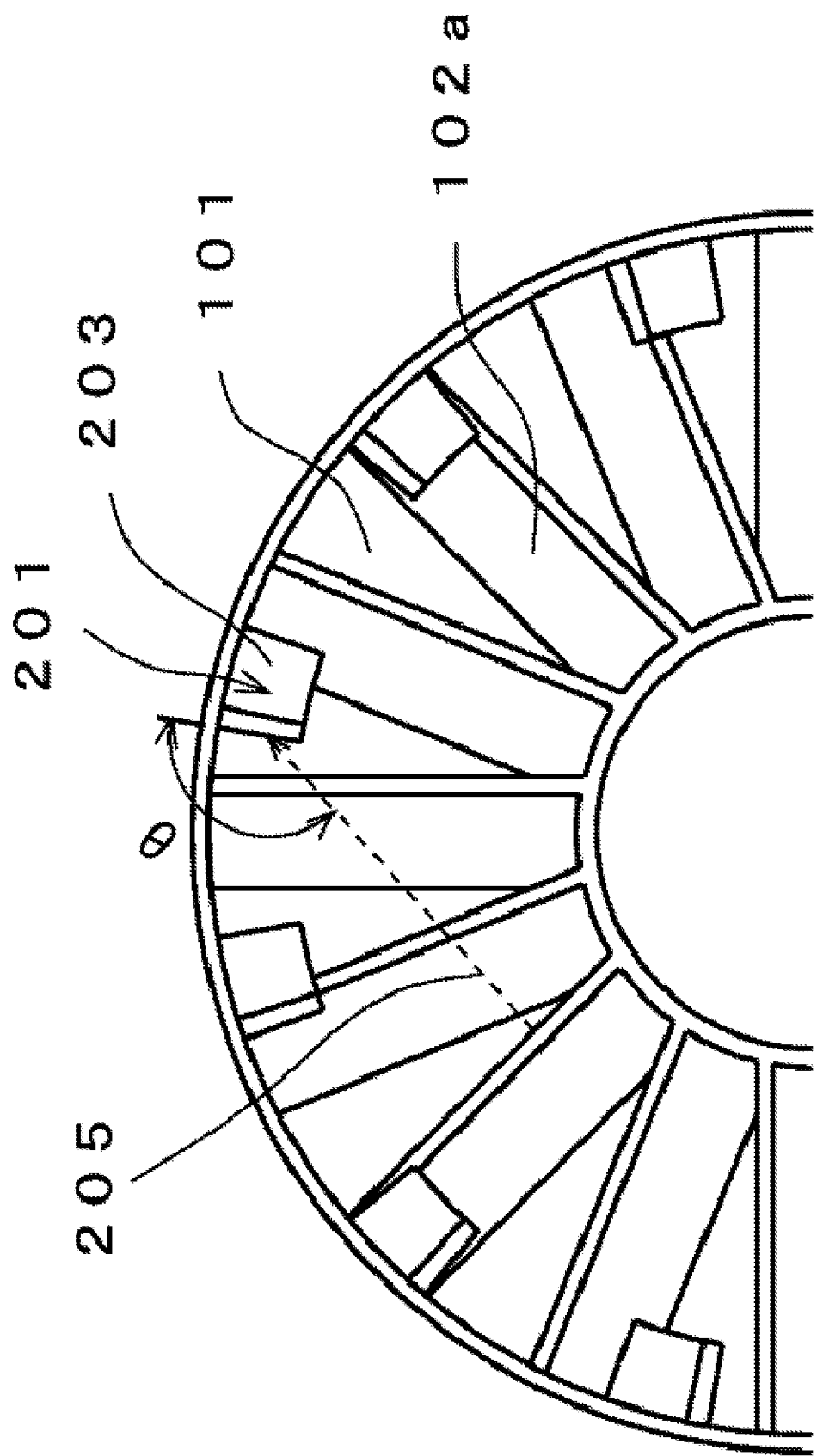
FIG. 13 is a diagram showing, from above, the inside of an inlet port according to the seventh embodiment of the present invention.

A seventh embodiment of the present invention is described next. FIG. 12 shows a vertical cross section of the seventh embodiment of the present invention, and FIG. 13 shows the inside of the inlet port 101 from above. Note that the same reference numerals as those shown in FIG. 1 are used in FIGS. 12 and 13, thereby omitting the descriptions of the corresponding components accordingly.

As shown in FIGS. 12 and 13, a reflection mechanism 201 is disposed above the rotor blades 102*a*. This reflection mechanism 201 is provided in such a manner as to be detachable from the inner wall of the inlet port 101 by the sealing 31. In this reflection mechanism 201, inclined plates 203, inclined at a predetermined angle in the same way described in FIG. 3, protrude radially from the inner wall of the inlet port 101 in the radial direction. However, for the purpose of explanation, in FIG. 13 the number of inclined plates 203 is less than the actual number of inclined plates. The difference between this reflection mechanism 201 and the reflection mechanism 30 shown in FIG. 1 is the length of the inclined plates 203. While the inclined plates 33 of the reflection mechanism 30 shown in FIG. 1 extend toward the central disc portion 35, the radial length of the inclined plates 203 of the reflection mechanism 201 is short, which is approximately 10% to 20% of the radial distance to the center of the inlet port 101.

According to this configuration, the particle reflected on the chamfered surface 21 of the rotor blade 102a flies in a direction perpendicular to the chamfered surface 21, as shown by a dotted arrow 205 in FIG. 13. The particle reflected on this chamfered surface 21 is re-reflected on the corresponding inclined plate 203 and falls downward. Since a large number of inclined plates 203 are installed, the particle reflected on the chamfered surface 21 can be re-reflected on the inclined plate 203 no matter what angle at which the particle is reflected.

As described above, unlike the reflection mechanism 30 of FIG. 1, the inclined plates 203 of the reflection mechanism 201 are not present at the center but are installed only in the vicinity of the tip ends of the rotor blades 102a. Therefore, the exhaust resistance becomes smaller compared to the first embodiment, and deterioration of the exhaust performance can be reduced.

Figure 14:
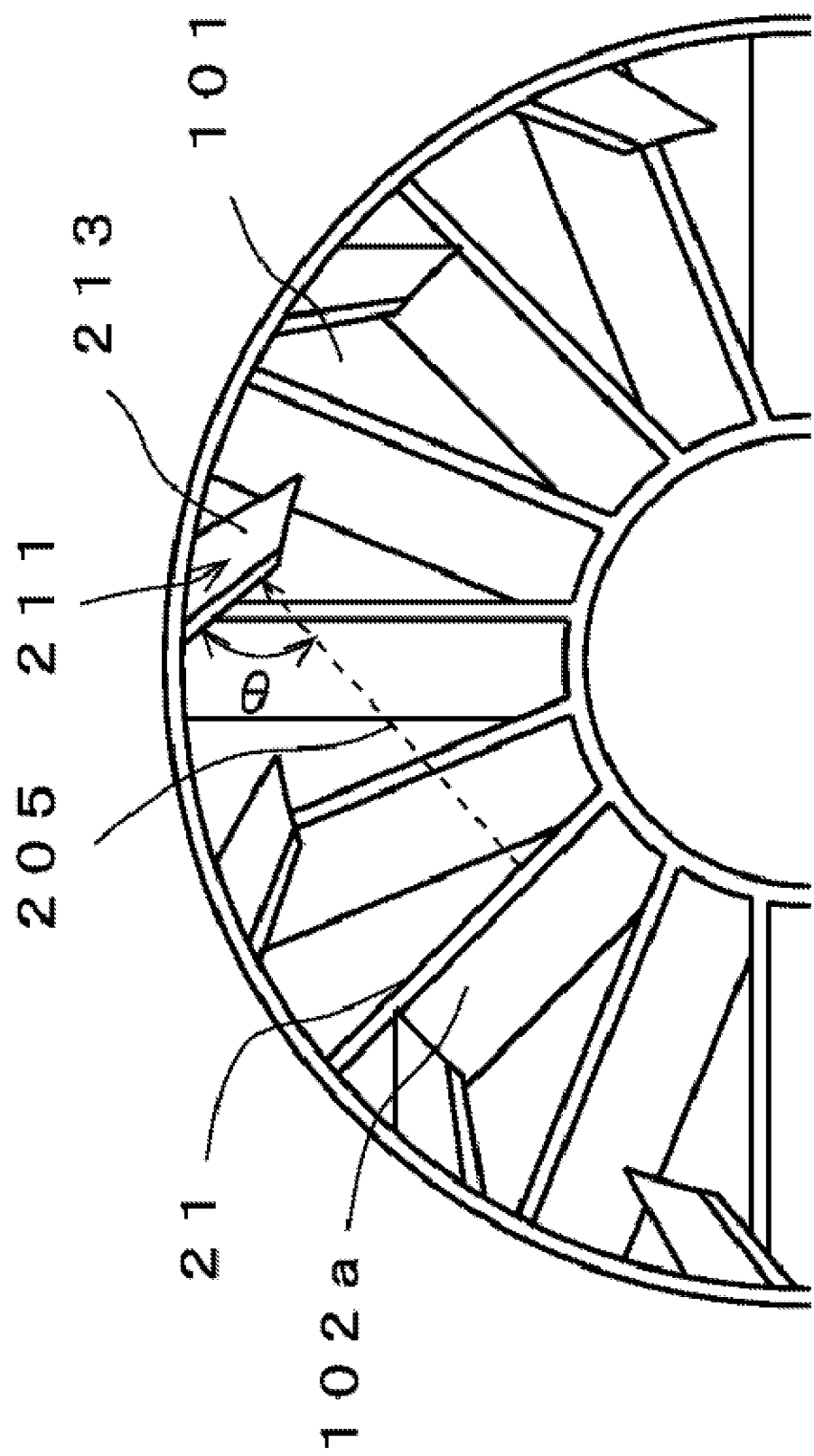
FIG. 14 is a diagram showing, from above, the inside of an inlet port according to an eighth embodiment of the present invention.

An eighth embodiment of the present invention is described next. FIG. 14 shows, from above, the inside of the inlet port 101 according to the eighth embodiment of the present invention. Note that the same reference numerals as those shown in FIG. 1 are used in FIG. 14, thereby omitting the descriptions of the corresponding components accordingly. The longitudinal sectional view of the eighth embodiment of the present invention is the same as that of FIG. 12.

In FIG. 13, the inclined plates 203 of the reflection mechanism 201 are oriented in the radial direction, and the particle that enters from the direction shown by the dotted arrow 205 enters each inclined plate 203 at an angle θ larger than 90 degrees. In this case, instead of falling directly below, the particle entering the inclined plate 203 at the angle θ larger than 90 degrees tends to be reflected radially outward.

In the eighth embodiment of the present invention, inclined plates 213 of a reflection mechanism 211 are each provided with an angle of advance with respect to the inclined plates 203 shown in FIG. 13, so that the angle θ between each inclined plate 213 and the direction of the dotted arrow 205 becomes approximately 90 degrees, as shown in FIG. 14. Providing such an angle of advance means that the inclined plate 213 is inclined at a predetermined angle in the rotational direction from the imaginary line extending from the inner wall of the inlet port 101 to the center of the inlet port 101, whereas the inclined plate 203 is disposed in the radial direction from the inner wall of the inlet port 101 to the center of the inlet port 101.

Specifically, the chamfered surface 21 of the rotor blade 102a on which the particle is reflected, and the inclined plate 213 of the reflection mechanism 211 on which the particle is re-reflected, are configured to be parallel at one point of the angle of rotation of the rotor blade 102a, as shown in FIG. 14.

According to this configuration, the particle reflected on the chamfered surface 21 of the rotor blade 102a is re-reflected without being shifted radially outward on the inclined plate 213, and falls almost exactly downward.

Figure 15:
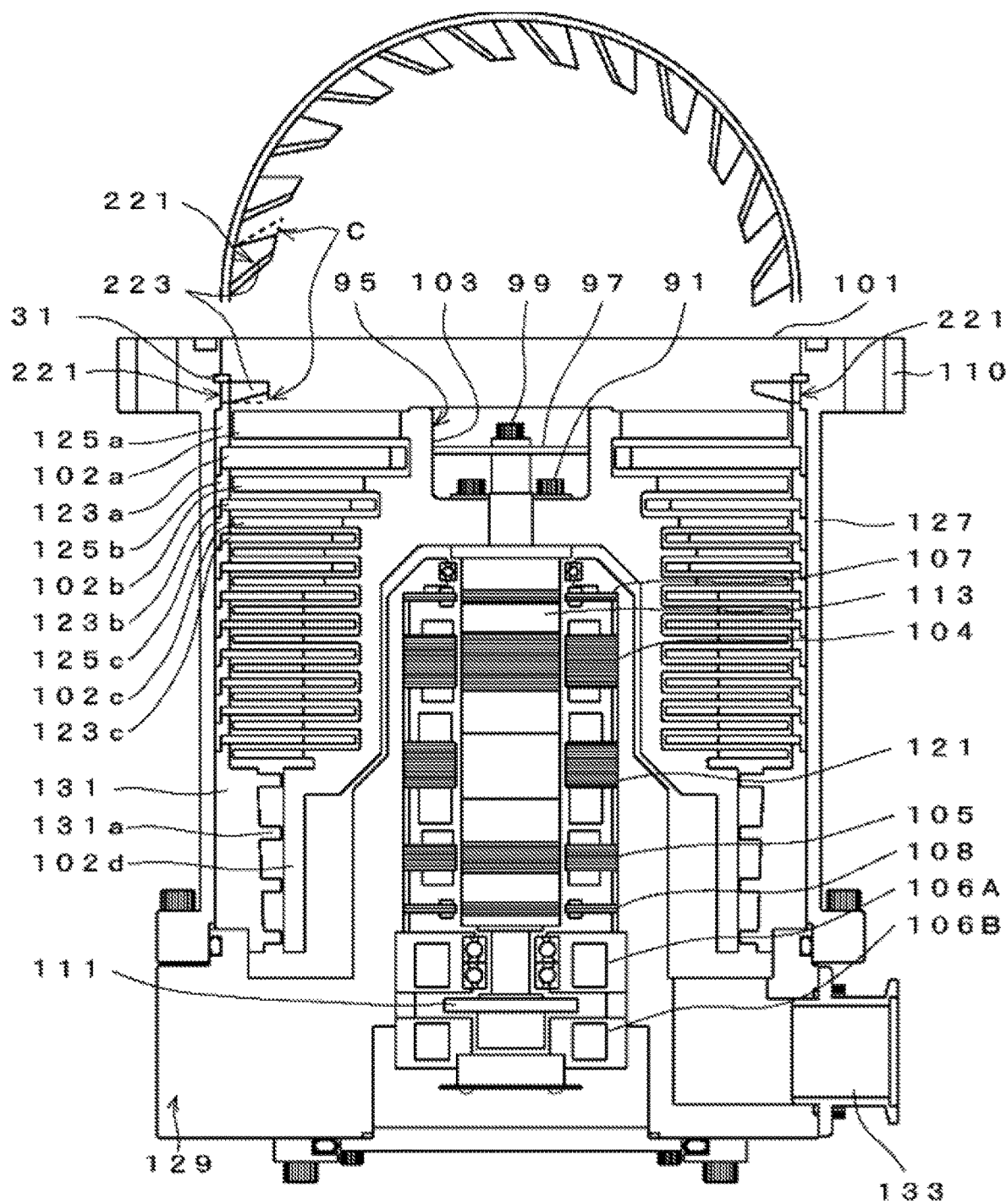
FIG. 15 is a configuration diagram of a turbomolecular pump according to a ninth embodiment of the present invention.

A ninth embodiment of the present invention is described next. The lower part of FIG. 15 is a longitudinal sectional view of the ninth embodiment of the present invention, and the upper of FIG. 15 shows the inside of the inlet port 101 from above. Note that the same reference numerals as those shown in FIG. 1 are used in FIG. 15, thereby omitting the descriptions of the corresponding components accordingly.

In FIG. 15, inclined plates 223 of a reflection mechanism 221 have the same shape as the inclined plates 213 of the reflection mechanism 211 shown in FIG. 14. However, the reflection mechanism 221 is different from the reflection mechanism 211 of FIG. 14 in that a cutout is formed in a lower portion C of each inclined plate 223, the lower portion C being shown by a dotted line.

Forming the cutout in this configuration is now described. Increasing the number of inclined plates 213 in FIG. 14 raises the possibility that the particle that is re-reflected on an inclined plate 213 collides with the rear surface of the previous inclined plate 213 and is thereafter re-reflected toward the inlet port 101. Therefore, each inclined plate 223 of FIG. 15 is obtained by cutting a portion of each inclined plate 213 of FIG. 14 where the particle is likely to be re-reflected.

According to this configuration, the particle reflected on the chamfered surface 21 of the rotor blade 102a is re-reflected on the corresponding inclined plate 223 and then falls almost exactly downward without being re-re-reflected on the previous inclined plate 213.

Figure 16:
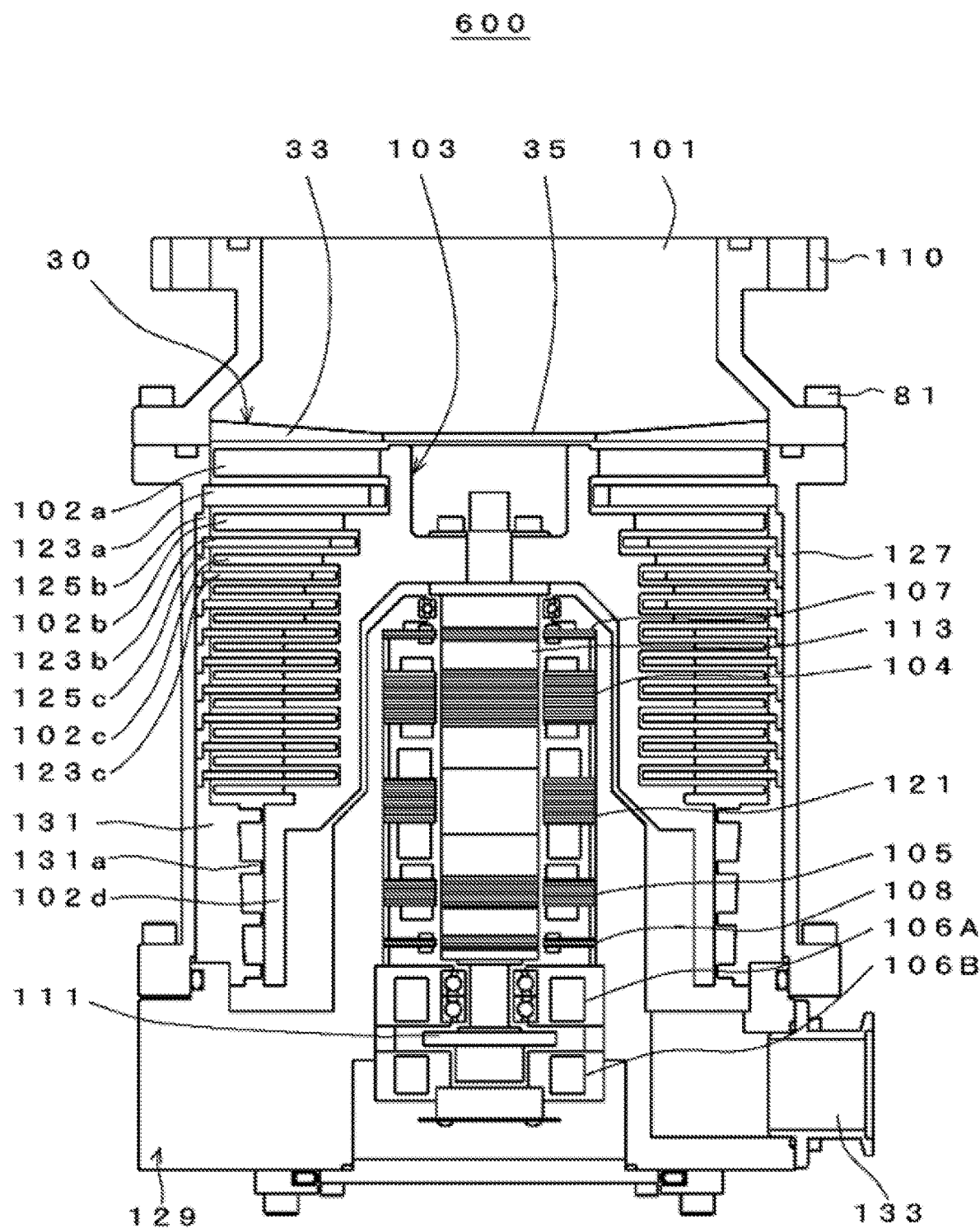
FIG. 16 is a configuration diagram of a turbomolecular pump according to a tenth embodiment of the present invention.

A tenth embodiment of the present invention is described next. FIG. 16 shows a configuration diagram of the tenth embodiment of the present invention. Note that the same reference numerals as those shown in FIG. 1 are used in FIG. 16, thereby omitting the descriptions of the corresponding components accordingly.

According to the tenth embodiment of the present invention, in a turbomolecular pump 600 of FIG. 16, the reflection mechanism 30 is disposed above the rotor blades 102a, as with the configuration shown in FIG. 1. However, unlike FIG. 1, the inside of the inlet port 101 does not have the same diameter in the height direction; the diameter of the upper portion of the inlet port 101 is narrower than the diameter of the lower portion of the same. In other words, the lower portion of the inlet port 101 has a section that expands downward in a tapering manner.

The first to ninth embodiments have described that the reflection mechanisms 30, 40, 50, 60, 70, 201, 211, 221 are each inserted through the inlet port 101, but in the present embodiment the inlet port 101 mounted with the reflection mechanism 30 is configured as a single part so as to be detachable with respect to the pump main body by bolts 81.

According to such structure, the reflection mechanisms 30, 40, 50, 60, 70, 201, 211, 221 can easily be attached/detached even when the reflection mechanisms 30, 40, 50, 60, 70, 201, 211, 221 are larger than the inner diameter of the upper portion of the inlet port 101.

In each of the embodiments described above, it is preferred that at least either the rotor blades 102a or the reflection mechanisms 30, 40, 50, 60, 70, 201, 211, 221 be subjected to a smoothing treatment such as chemical polishing, electrolytic polishing, or plating. By smoothing the surface of each member by means of such a smoothing treatment, the particle can be reflected in a target direction, consequently increasing the accuracy to prevent backflow of the particle.

In addition, by making the reflection mechanisms 30, 40, 50, 60, 70, 201, 211, 221 detachable by means of the sealing 31, screws 74 or the like described above, the reflection mechanisms can easily be replaced even when the particle adheres to the surface of each reflection mechanism and consequently deteriorates the effect of preventing backflow of the particle.

Figure 17:
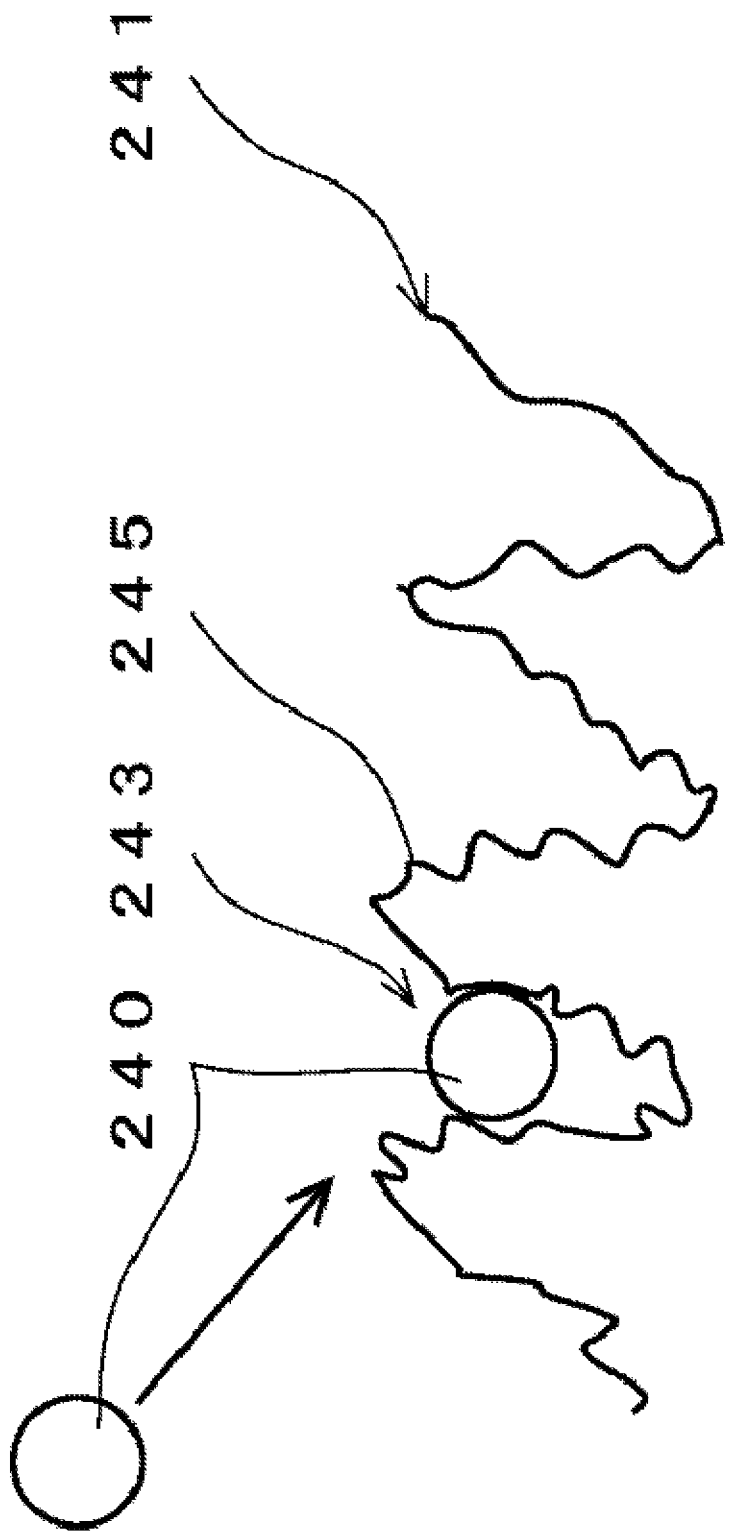
FIG. 17 is a configuration diagram of a turbomolecular pump according to an eleventh embodiment of the present invention.
Figure 18:
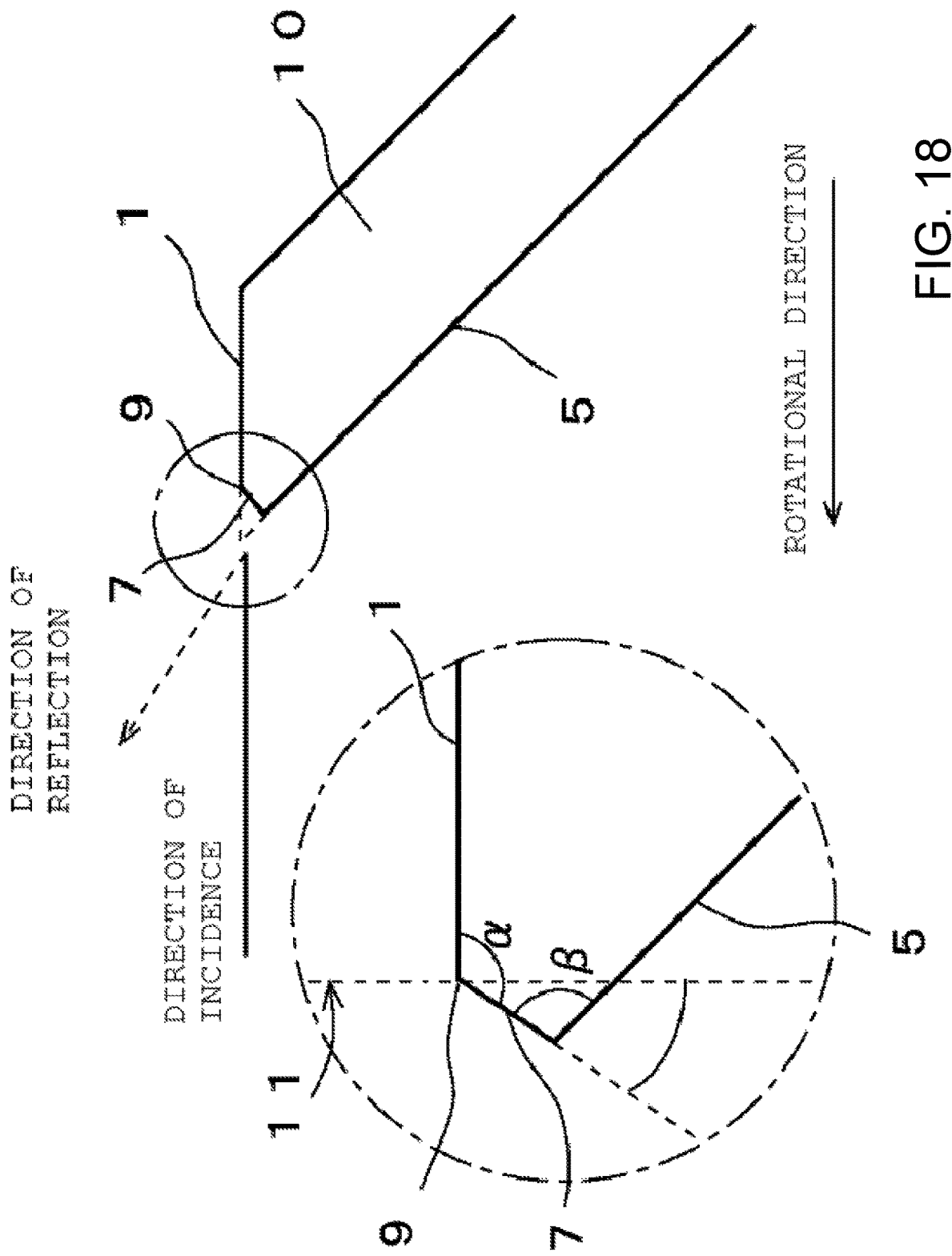
FIG. 18 is an example of a chamfered surface of a conventional rotor blade (part 1)
Figure 19:
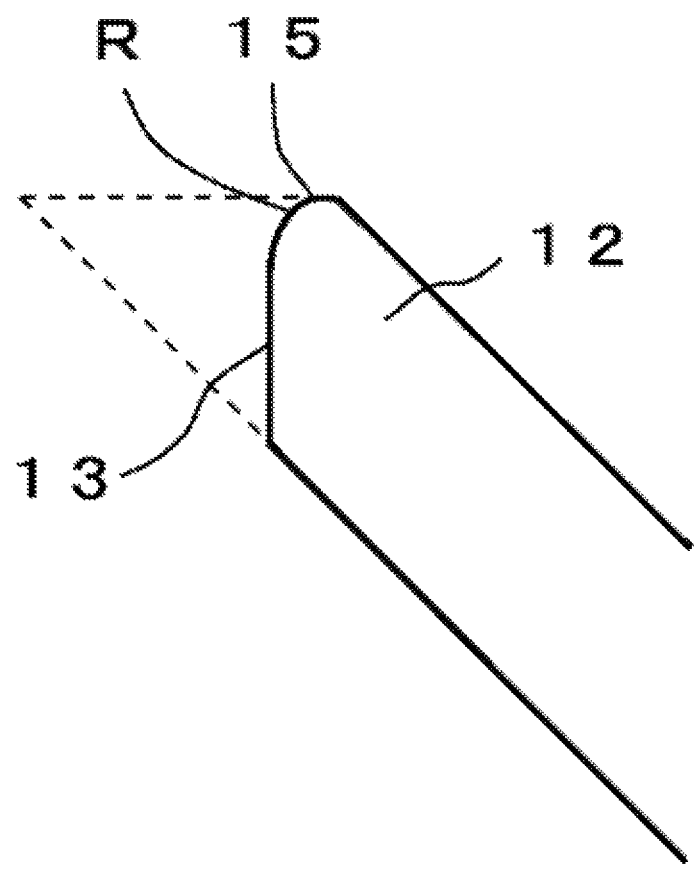
FIG. 19 is an example of the chamfered surface of the conventional rotor blade (part 2)
Figure 20:
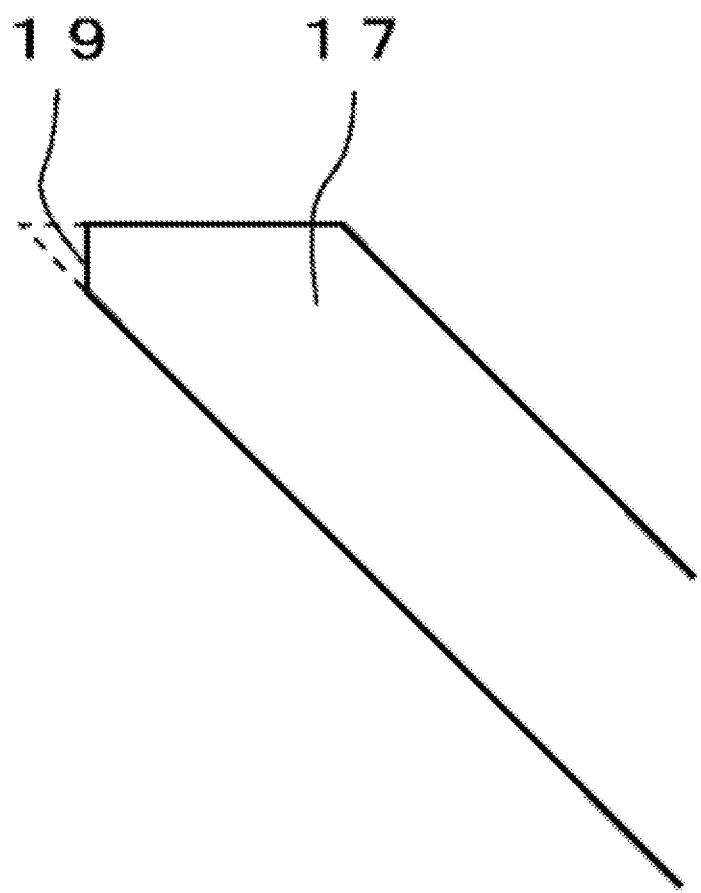
FIG. 20 is an example of the chamfered surface of the conventional rotor blade (part 3)
Figure 21:
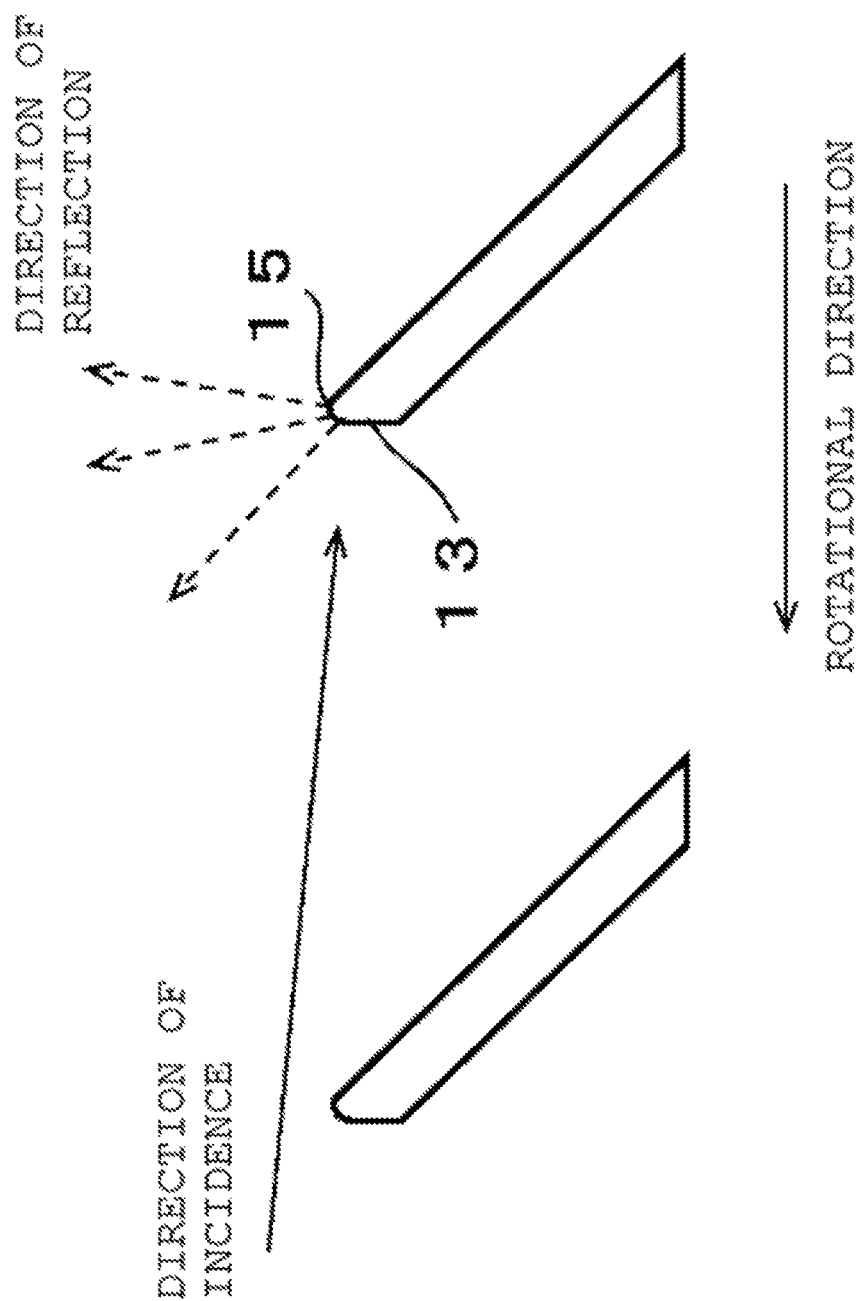
FIG. 21 is a diagram showing how a particle entering the chamfered surface of the conventional rotor blade is reflected (part 1)
Figure 22:
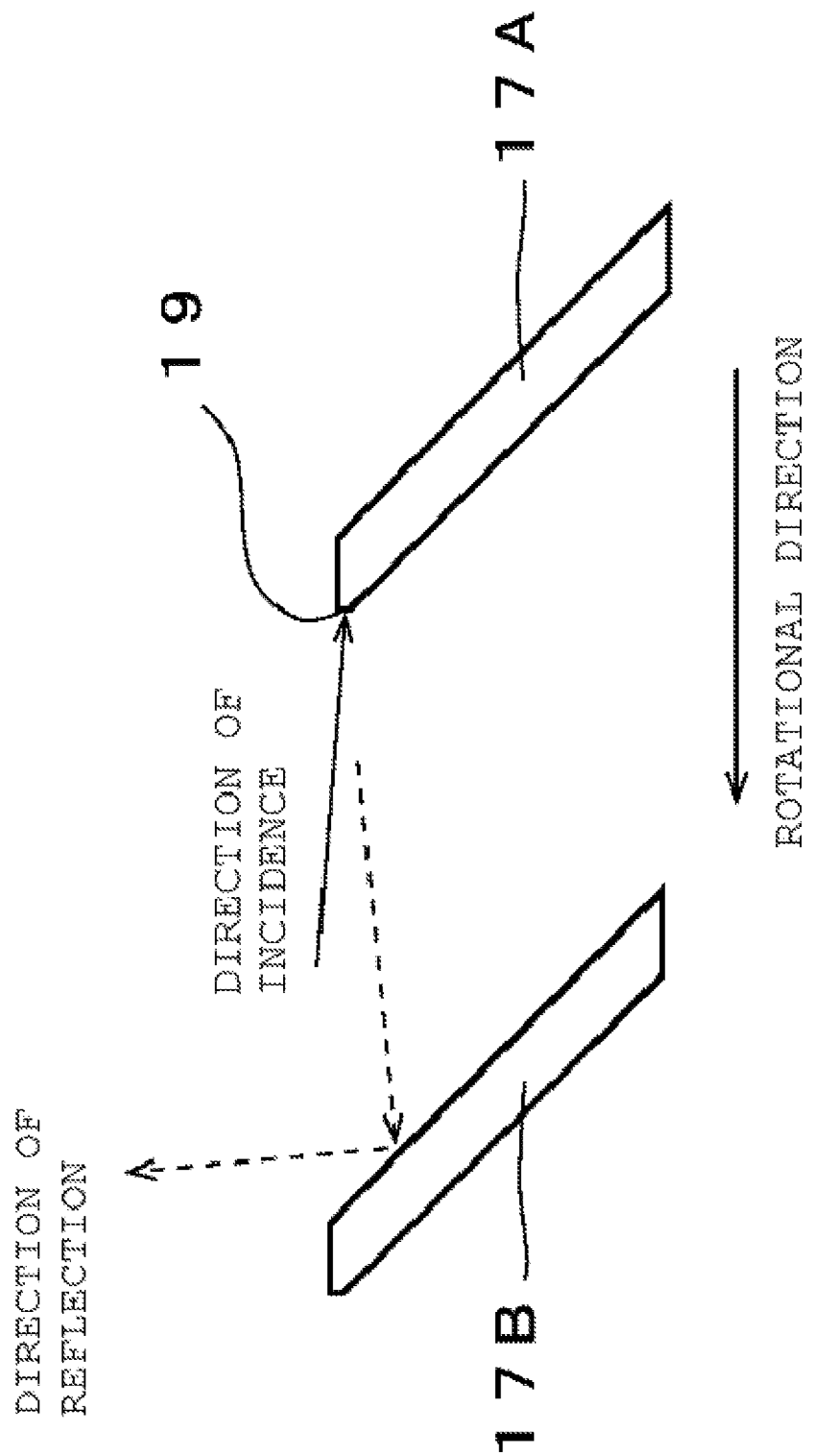
FIG. 22 is a diagram showing how the particle entering the chamfered surface of the conventional rotor blade is reflected (part 2).

An eleventh embodiment of the present invention is described next. As shown in FIG. 17, the rotor blades 102a and a surface 241 of the reflection mechanism 30, 40, 50, 60, 70, 201, 211, 221 with which the particle collides, are treated to have roughness so as to be able to capture a particle 240 shown in FIG. 17.

According to this configuration, the surface 241 has a hole 243 larger than the size of the particle 240 and is provided with a small roughness 245 capable of capturing the particle 240. The roughness is formed by chemical treatment such as etching or mechanical treatment such as blasting. The hole 243 and the roughness 245 do not have to be provided in both the rotor blades 102a and the reflection mechanisms 30, 40, 50, 60, 70, 201, 211, 221 and therefore may be provided in either ones.

In this manner, the particle 240 can be captured by the rotor blades 102a and the reflection mechanisms 30, 40, 50, 60, 70, 201, 211, 221. In a case where only a part of the surface is provided with the roughness, the part with the roughness can capture the particle 240 and the rest of the surface can reflect the particle as described in the first to tenth embodiments.

Each inclined plate 223 shown in FIG. 15 according to the ninth embodiment is obtained by cutting a portion of each inclined plate 213 of FIG. 14 where the re-re-reflection is likely to occur, but in plate of forming this cutout, for example, a part of the surface that corresponds to the cutout may be treated to have the roughness described in the eleventh embodiment, to capture the particle 240.

Moreover, although the third embodiment has described that the angle formed between the tapered section of the conical wall 51 and the axial direction is preferably 45 degrees or more, the angle formed between each inclined surface or inclined plate of the reflection mechanism and the axial direction is preferably 45 degrees or more in each of the embodiments other than the third embodiment. Accordingly, the particle having collided with each inclined surface or inclined plate is securely reflected in the downstream direction.

Furthermore, any combination of the embodiments described above may be used.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

What is claimed is:
1. A vacuum pump, comprising:
a rotating shaft configured to rotate in a rotational direction;
a rotor blade that is fixed to the rotating shaft and has a blade having a chamfered surface at least partially facing in the rotational direction and formed between a horizontal surface facing in an upstream direction and a lower-side inclined surface at least partially facing in the rotational direction and at least partially facing in a downstream direction; and
a reflection mechanism that is disposed upstream of the rotor blade, wherein
the chamfered surface is inclined in an oblique upstream direction at a predetermined angle from an axial direction of a rotating body in such a manner that a particle having collided with the chamfered surface is reflected toward the reflection mechanism.

2. The vacuum pump according to claim 1, wherein in the blade, the chamfered surface is formed in a collidable region L where the particle can collide, the collidable region L being specified based on Formula 1 below where d represents an interval between the blade and a blade adjacent thereto, v1 represents a fall velocity of the particle, and v2 represents a peripheral speed of the blade:

$$L=d \times v1/v2. \qquad \text{[Formula 1]}$$

3. The vacuum pump according to claim 1, wherein
the reflection mechanism has an inclined plate for re-reflecting, toward a downstream side, the particle reflected on the chamfered surface, and
the inclined plate is disposed radially in a radial direction.

4. The vacuum pump according to claim 1, wherein
the reflection mechanism has an inclined plate for re-reflecting, toward a downstream side, the particle reflected on the chamfered surface, and
the inclined surface is formed to protrude by a predetermined length from an inner wall of an inlet port in a radial direction.

5. The vacuum pump according to claim 4, wherein the inclined plate is inclined at a predetermined angle in the rotational direction, from an imaginary line extending from the inner wall of the inlet port toward a center of the inlet port.

6. The vacuum pump according to claim 4, wherein the inclined plate has a cutout formed at a lower portion thereof.

7. The vacuum pump according to claim 3, wherein the reflection mechanism is formed based on Formula 2 below where W presents an interval between the inclined plate and an inclined plate adjacent thereto, Φ represents an inclination angle of the inclined plate, H represents a height of the inclined plate, and θ represents a reflection angle of the particle:

$$W=H \times (1/\tan\theta + 1/\tan\Phi). \qquad \text{[Formula 2]}$$

8. The vacuum pump according to claim 3, wherein a height of the inclined plate gradually is reduced from a casing side toward an inside of the casing.

9. The vacuum pump according to claim 3, wherein the inclined plate is disposed in the vicinity of the blade and functions as a stator blade.

10. The vacuum pump according to claim 1, wherein
the reflection mechanism has an inclined surface or an inclined plate for re-reflecting, toward a downstream side, the particle reflected on the chamfered surface of the rotor blade, and
the inclined surface or the inclined plate is formed in a circumferential direction.

11. The vacuum pump according to claim 10, wherein the inclined surface or the inclined plate is configured in such a manner that the particle collides within a range of a height Ht of the inclined surface or the inclined plate, the height Ht being specified based on Formula 3 below where θ represents a reflection angle of the particle, Ri represents a horizontal distance from a center of the rotating shaft to a root of the blade, and Rc represents a horizontal distance from the center of the rotating shaft to the inclined surface or the inclined plate:

$$Ht > (Rc^2 - Ri^2) \times \tan \theta. \qquad \text{[Formula 3]}$$

12. The vacuum pump according to claim 1, further comprising:
    a first fastening means for fastening the rotor blade to the rotating shaft; and
    a cover plate for covering the first fastening means.
13. The vacuum pump according to claim 12, further comprising a second fastening means for fastening the cover plate to the rotating shaft or the rotor blade, wherein
    a surface of the second fastening means is formed into a smooth surface.
14. The vacuum pump according to claim 10, wherein an angle formed between the inclined surface or the inclined plate and an axial direction of the rotating body is 45 degrees or more.
15. The vacuum pump according to claim 1, wherein a surface of at least one of the blade and the reflection mechanism is subjected to a smoothing treatment.
16. The vacuum pump according to claim 1, wherein a surface of at least one of the blade and the reflection mechanism has roughness for capturing the particle.
17. The vacuum pump according to claim 1, wherein the reflection mechanism is installed so as to be detachable from an inlet port.
18. A vacuum pump, comprising:
    a rotating shaft configured to rotate in a rotational direction;
    a rotor blade that is fixed to the rotating shaft and has a blade having a chamfered surface at least partially facing in the rotational direction and formed between a horizontal surface facing in an upstream direction and a lower-side inclined surface at least partially facing in the rotational direction and at least partially facing in a downstream direction;
    a reflection mechanism that is disposed upstream of the rotor blade; and
    an outer cylinder locating the rotor blade and the reflection mechanism inside, wherein
    the chamfered surface is inclined in an oblique upstream direction at a predetermined angle from an axial direction of a rotating body in such a manner that a particle having collided with the chamfered surface is reflected toward the reflection mechanism.

* * * * *